(12) United States Patent
Sidiropoulos et al.

(10) Patent No.: US 12,483,044 B2
(45) Date of Patent: Nov. 25, 2025

(54) STATE OF HEALTH AND STATE OF CHARGE BALANCING OF INTELLIGENT BATTERY SYSTEM

(71) Applicant: Volvo Car Corporation, Gothenburg (SE)

(72) Inventors: Nikitas Sidiropoulos, Öjersjö (SE); Jonas Forssell, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 734 days.

(21) Appl. No.: 17/565,583

(22) Filed: Dec. 30, 2021

(65) Prior Publication Data
US 2023/0216313 A1 Jul. 6, 2023

(51) Int. Cl.
*H02J 7/00* (2006.01)
*G01R 31/382* (2019.01)
*G01R 31/392* (2019.01)
*H01M 10/48* (2006.01)

(52) U.S. Cl.
CPC .......... *H02J 7/0014* (2013.01); *G01R 31/382* (2019.01); *G01R 31/392* (2019.01); *H01M 10/482* (2013.01); *H02J 7/0048* (2020.01); *H02J 7/005* (2020.01)

(58) Field of Classification Search
CPC .................. H01M 10/482; H02J 7/0014
See application file for complete search history.

(56) References Cited

U.S. PATENT DOCUMENTS

| 5,622,789 | A | 4/1997 | Young |
| 8,134,338 | B2 | 3/2012 | Choi |
| 9,362,757 | B2 | 6/2016 | Deal et al. |

(Continued)

FOREIGN PATENT DOCUMENTS

| EP | 2681782 B1 | 1/2014 |
| EP | 2705564 B1 | 3/2014 |

(Continued)

OTHER PUBLICATIONS

International Search Report and Written Opinion received for PCT Application Serial No. PCT/EP2022/085528 dated Mar. 14, 2023, 13 pages.

(Continued)

*Primary Examiner* — Robert Grant
(74) *Attorney, Agent, or Firm* — Amin, Turocy & Watson, LLP

(57) ABSTRACT

One or more embodiments herein can facilitate charging and/or discharging of one or more units (e.g., battery cells and/or multi-cell battery clusters of battery cells) based at least in part on state of charge and/or state of health monitoring at one or more of the cell-level and/or cluster-level. An exemplary method can comprise monitoring, by a system operatively coupled to a processor, cell states of cells of a multi-cell battery cluster, and selectively determining, by the system, based on the cell states, a time-based order for electrically connecting the cells to an external apparatus for current flow between the external apparatus and the cluster. The cell states can be provided as a function of a cluster state of the cluster. The cell states can be provided as one or more of states of health of the cells or states of charge of the cells determined from the monitoring.

20 Claims, 15 Drawing Sheets

(56) References Cited

U.S. PATENT DOCUMENTS

| | | | |
|---|---|---|---|
| 9,891,286 | B2 | 2/2018 | Fetzer et al. |
| 10,056,654 | B2 | 8/2018 | Butzmann et al. |
| 10,205,327 | B2 | 2/2019 | Okui |
| 10,283,987 | B1 | 5/2019 | Wang et al. |
| 10,367,239 | B1 | 7/2019 | Dao |
| 2009/0296442 | A1 | 12/2009 | Chang et al. |
| 2013/0127399 | A1* | 5/2013 | Tang ............. B60L 58/15 |
| | | | 320/103 |
| 2015/0365788 | A1 | 12/2015 | Lidgren et al. |
| 2016/0226268 | A1 | 8/2016 | Okui |
| 2016/0365788 | A1 | 12/2016 | Singh et al. |
| 2017/0256984 | A1 | 9/2017 | Ding et al. |
| 2018/0175638 | A1 | 6/2018 | Zhu |
| 2020/0011934 | A1 | 1/2020 | Tabatowski-Bush et al. |
| 2020/0142004 | A1 | 5/2020 | Ito et al. |
| 2020/0164763 | A1 | 5/2020 | Holme |
| 2020/0207219 | A1 | 7/2020 | Slepchenkov et al. |
| 2020/0274368 | A1 | 8/2020 | Crouse, Jr. |
| 2020/0274370 | A1 | 8/2020 | Krieg |
| 2020/0361337 | A1* | 11/2020 | Ohmori ............. H02J 7/02 |
| 2021/0126471 | A1 | 4/2021 | Srivastava et al. |
| 2021/0376629 | A1 | 12/2021 | Chen et al. |

FOREIGN PATENT DOCUMENTS

| | | | |
|---|---|---|---|
| EP | 3 151 360 | A1 | 4/2017 |
| EP | 3 247 022 | A1 | 11/2017 |
| EP | 3 637 577 | A1 | 4/2020 |
| EP | 4 046 856 | A1 | 8/2022 |
| EP | 4108508 | A1 | 12/2022 |
| EP | 4 190 621 | A1 | 6/2023 |
| EP | 4 195 353 | A1 | 6/2023 |
| EP | 4199177 | A2 | 6/2023 |
| GB | 2584424 | A | 12/2020 |
| JP | 2021-19371 | A | 2/2021 |
| KR | 10-2137759 | B1 | 7/2020 |
| KR | 10-2180138 | B1 | 11/2020 |
| WO | 2020219440 | A1 | 10/2020 |

OTHER PUBLICATIONS

Notice of Allowance received for U.S. Appl. No. 17/306,230, dated Mar. 7, 2024, 13 pages.
Notice of Allowance received for U.S. Appl. No. 17/306,248, dated Mar. 28, 2024, 13 pages.
Final Office Action received for U.S. Appl. No. 17/306,256, dated Mar. 21, 2024, 49 pages.
Xia et al., "State-of-charge Balancing of Lithium-ion Batteries with State-of-health Awareness Capability" DOI 10.1109/TIA.2020.3029755 (2020) 12 pages.
Chowdhury et al., "An Integrated State of Health (SOH) Balancing Method for Lithium-Ion Battery Cells" 978-1-7281-0395-2/19/$31.00 © 2019 IEEE (2019) 5 pages.
Forssell et al., "Intelligent Battery Cell With Integrated Monitoring and Switches" U.S. Appl. No. 63/059,300, filed Jul. 31, 2020.
Ekström et al., "Intelligent Battery Cell" U.S. Appl. No. 63/246,483, filed Sep. 21, 2021.
Notice of Allowance received for U.S. Appl. No. 17/306,248, dated Dec. 20, 2023, 24 pages.
Notice of Allowance received for U.S. Appl. No. 17/306,221, dated Dec. 18, 2024, 6 pages.
Notice of Allowance received for U.S. Appl. No. 17/306,221, dated Jan. 24, 2024, 6 pages.
LCSC Electronics, "Ai-Thinker ESP-12S", Shenzhen LCSC Electronics Technology Co., Ltd.https://lcsc.com/product-detail/WIFI-Modules_ESP-12S_C82898.html, 2020, Last Accessed Feb. 9, 2024, 3 pages.
coilcraft.com, "MSD1514 Series", https://www.coilcraft.com/en-us/products/power/coupled-inductors/1-1-shielded-coupled/msd/msd1514/, Copyright 2021, Coilcraft, Inc., 7 pages.
LCSC Electronics, "Ai-Thinker ESP-12S", https://lcsc.com/product-detail/WIFI-Modules_ESP-12S_C82898.html,2020 Shenzhen LCSC Electronics Technology Co., Ltd.
Rohm Co., "Calculation of Power Loss (Synchronous)", No. AEK59-D1-0065-2, 2016. 10-Rev. 003, © 2016 ROHM Co., Ltd., 4 pages.
Extended European Search Report received for European Application No. 21188834.2 dated Dec. 10, 2021, 8 pages.
Communication pursuant to Rule 69 EPC Received for European Patent Application No. 21188834.2 dated Feb. 7, 2022, 2 pages.
Non-Final Office Action received for U.S. Appl. No. 17/306,221, dated Feb. 6, 2023, 39 pages.
Communication pursuant to Article 94(3) EPC received for EP Patent Application Serial No. 21188834.2 dated Mar. 22, 2023, 4 pages.
Non-Final Office Action received for U.S. Appl. No. 17/306,230, dated May 11, 2023, 38 pages.
Communication pursuant to Rule 114(2) EPC received for EP Patent Application Serial No. 21188834.2 dated May 3, 2023, 3 pages.
Final Office Action received for U.S. Appl. No. 17/306,221, dated Jul. 17, 2023, 121 pages.
Notice of Allowance received for U.S. Appl. No. 17/306,221, dated Oct. 10, 2023, 36 pages.
Final Office Action received for U.S. Appl. No. 17/306,230, dated Oct. 10, 2023, 26 pages.
Ex Parte Quayle Action received for U.S. Appl. No. 17/306,248, dated Oct. 12, 2023, 39 pages.
Non-Final Office Action received for U.S. Appl. No. 17/306,256, dated Sep. 12, 2023, 58 pages.
Notice of Allowance received for U.S. Appl. No. 17/306,230, dated Jan. 8, 2024, 41 pages.
Communication pursuant to Article 94(3) EPC received for EP Patent Application Serial No. 21188834.2 dated Nov. 13, 2024, 5 pages.
Notice of Allowance for U.S. Appl. No. 17/306,256 dated Jun. 21, 2024.
Correction Notice dated Mar. 13, 2025 for CN Application No. 202510163994.7.
Extended EP Search Report dated Jun. 13, 2025 for EP Application No. 25157563.5.
Partial Supplementary European Search Report received for EP Patent Application Serial No. 25155301.2 dated Jul. 16, 2025, 14 pages.
Communication Pursuant to Rule 69 EPC received for EP Patent Application Serial No. 25157563.5 dated Aug. 25, 2025, 2 pages.

* cited by examiner

STATE OF HEALTH AND STATE OF CHARGE BALANCING OF INTELLIGENT BATTERY SYSTEM

BACKGROUND

In existing technologies, an electric driveline (e.g., an electric driveline used in an electric vehicle) can be based on a battery with a direct current (DC) voltage of a single voltage quantity. Systems, such as vehicle systems, can be designed around such battery to protect and to control the battery. Auxiliary units can be used to generate alternating current (AC) voltage to run motors and charge the battery. All these systems can be complex and expensive and can be a source of error.

Also in existing technologies, the battery can comprise one or more battery packs each comprising one or more cells. These battery packs are always on. That is, the battery packs always have a live voltage. The battery packs provide a constant and single voltage and therefore the auxiliary units described above are used to provide fluctuating voltage (e.g., AC voltage) and/or lower voltage (e.g., 12V, 14V, 48V, etc.). In addition, existing battery management systems (BMSs) for such batteries include a set of sensor cables and/or submodules that can add complexity and/or cost to a parent system employing the BMS and one or more of the batteries. The existing BMSs monitor only battery cell parameters and not global battery pack parameters, and are not integrated inside the respective battery packs. Low cell and/or battery pack life and/or malfunction

SUMMARY

The following presents a summary to provide a basic understanding of one or more embodiments described herein. This summary is not intended to identify key or critical elements, or to delineate any scope of the particular embodiments and/or any scope of the claims. The sole purpose of the summary is to present concepts in a simplified form as a prelude to the more detailed description that is presented later.

In one or more embodiments described herein, devices, systems, methods and/or apparatuses are described that can facilitate cell charging and/or discharging of cells in a multi-cell battery pack in a manner that facilitates extending cell life and/or widening a an available state of charge (SOC) window. These one or more operations can be facilitated by monitoring and/or use of one or more cell states or cluster states including SOC and/or state of health (SOH).

According to one embodiment, a method can comprise monitoring, by a system operatively coupled to a processor, cell states of cells of a multi-cell battery cluster, and selectively determining, by the system, based on the cell states, a time-based order for electrically connecting the cells to an external apparatus for current flow between the external apparatus and the multi-cell battery cluster.

In one or more embodiments, the cell states can be provided as a function of a cluster state of the multi-cell battery cluster.

In one or more embodiments, the cell states can be provided as one or both of states of health of the cells or states of charge of the cells determined from the monitoring.

In one or more embodiments, the controller can comprise a processor that monitors temperature or battery charge of the battery cell.

In one or more embodiments, the method can further comprise selectively charging, by the system, the cells of the multi-cell battery cluster, and simultaneously with the selective charging, selectively discharging, by the system cells of another multi-cell battery cluster, wherein the multi-cell battery cluster and the another multi-cell battery cluster are connected together as a multi-cluster battery system.

According to another embodiment, a device can comprise a multi-cell battery cluster, and a controller connected to cells of the multi-cell battery cluster, wherein the controller monitors cell states of the cells of the multi-cell battery cluster, and wherein the controller selectively determines, based on the cell states, a time-based order for electrically connecting the cells to an external apparatus for current flow between the external apparatus and the multi-cell battery cluster.

According to yet another embodiment, a system can comprise a vehicle comprising multi-cell battery clusters comprising battery cells, and controllers connected to the cells of the multi-cell battery clusters, wherein the controllers monitor cell states of the cells, and wherein the controllers selectively determine, based on the cell states, a time-based order for electrically connecting the cells to an external apparatus for current flow between the external apparatus and the multi-cell battery clusters.

DESCRIPTION OF THE DRAWINGS

One or more exemplary embodiments are described below in the Detailed Description section with reference to the following drawings.

DETAILED DESCRIPTION

Figure 1:
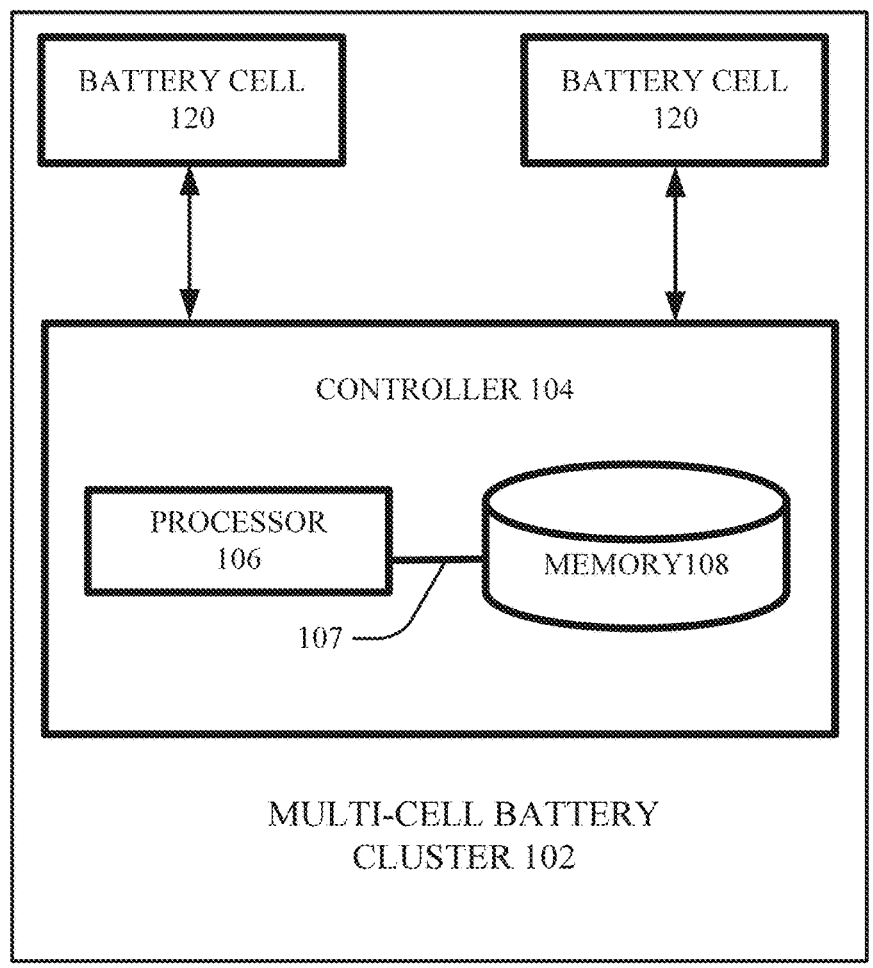
FIG. 1 illustrates a block diagram of a multi-cell battery cluster, in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. It will be understood that when an element is referred to as being "coupled" to another element, it can describe one or more different types of coupling including, but not limited to, chemical coupling, communicative coupling, electrical coupling, electromagnetic coupling, operative coupling, optical coupling, physical coupling, thermal coupling, and/or another type of coupling. Likewise, it will be understood that when an element is referred to as being "connected" to another element, it can describe one or more different types of connecting including, but not limited to, electrical connecting, electromagnetic connecting, operative connecting, optical connecting, physical connecting, thermal connecting, and/or another type of connecting. As used herein, the terms "entity", "requesting entity" and "user entity" can refer to a machine, device, component, hardware, software, smart device and/or human.

While one or more devices and/or systems are described below with reference to a wheeled vehicle, such as an automobile, the one or more embodiments described herein are not limited to this use. A battery device and/or battery system described herein can be implemented in any suitable electronic system such as, for instance, an electric driveline of an electric vehicle (EV). Indeed, the one or more devices and/or systems described herein can be utilized with any of a military vehicle, marine vehicle such as a boat or marine drone, winged vehicle such as a plane, and/or rotor-ed vehicle such as a helicopter or drone. Likewise, usage can extend to a robot and/or any suitable mobile and/or stationary device having use of a battery device or battery system.

Turning now to the figures, one or more embodiments described herein can include one or more devices, systems, apparatuses and/or system-implemented methods that can facilitate balancing of cell usage of cells of a battery system. The balancing can be at a cell level and/or at a cluster level of multi-cell battery clusters. The usage of the cells can include charging and/or discharging. Balancing can include monitoring and employing cell states and/or cluster states, such as states of health (SOH) and/or states of charge (SOC). Further, the one or more embodiments described herein can facilitate provision of varying AC output voltage or DC output voltage, including selectively separately providing a positive voltage output, a negative voltage output and no voltage output (e.g., bypass) on the cell level and/or on the cluster level.

As used herein, a cluster state is understood as being a function of cell states. Thus, monitoring and/or order/priority determination at a cluster level still can comprise monitoring and/or order/priority determination at a cell level. That is, cluster level monitoring and/or determinations can comprise, be based on and/or be a function of cell state monitoring and/or determination.

Looking first to FIG. 1, illustrated is a battery device 100 comprising a multi-cell battery cluster 102. Generally, the multi-cell battery cluster 102 comprises one or more cells 120, such as a plurality of cells 120. A controller 104 is connected by any suitable means, such as communicatively and/or electrically connected, to one or more of the cells 120. In one or more embodiments, the controller 104 can be generally connected to each of the cells 120.

The controller 104 can comprise any suitable components, such as a processor 106, memory 108 and bus 107, for monitoring, controlling and/or generally communicating with the cells 120. In one or more examples, the controller 104 can monitor cell states of the cells 120. Based on the cell states, the controller 104 can determine, such as generate, an order for electrically connecting the cells 120 to an external apparatus for current flow between the external apparatus and the multi-cell battery cluster 102. The order can be a time-based order, such as where certain cells 120 are connected in time prior to, during or after other cells 120. The connection can be for charging and/or discharging of the cells 120. The connection can be made by any suitable component, such as one or more switches, transistors, h-bridge and/or the like.

Figure 2:
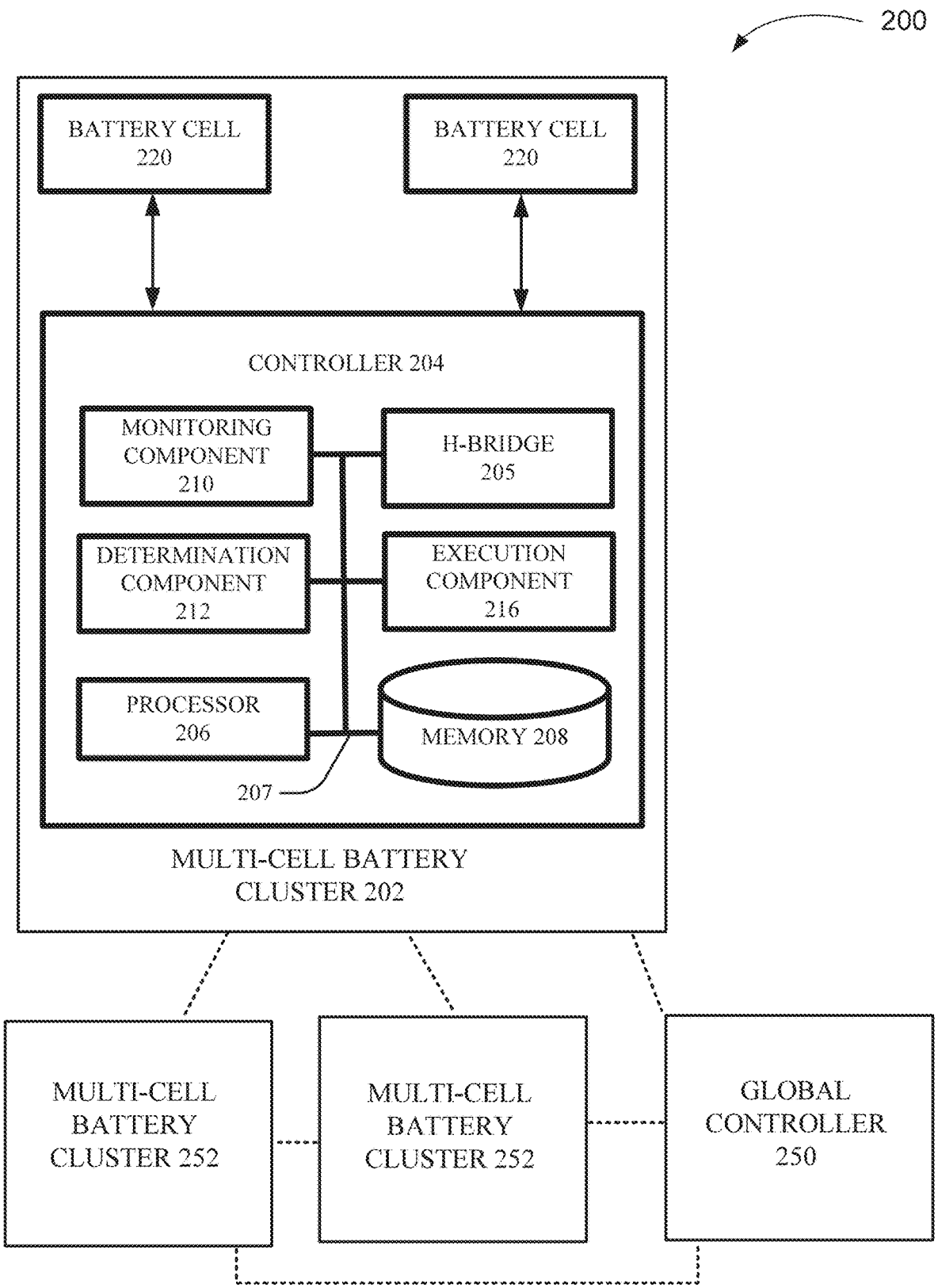
FIG. 2 illustrates a block diagram of a multi-cluster battery system, in accordance with one or more embodiments described herein.

Turning now to FIG. 2, illustrated is a battery system at 200. The battery system 200 comprises a multi-cell battery cluster 202. Like the multi-cell battery cluster 102, the multi-cell battery cluster 202 can comprise one or more cells 220, such as a plurality of cells 220. Each battery cell 220 can be a power source in itself and can comprise any suitable materials, including any suitable material for retaining charge. The battery cells 220 can be connected to one another, such as via pole connectors of the battery cells 220.

Generally, a controller 204 can control usage of the cells 220, and an h-bridge 205 of the controller 204 can facilitate connection, disconnection and/or bypass of individual cells 220 to one another and/or to an external apparatus.

More particularly regarding the h-bridge 205, any suitable number of switches, transistors, capacitors and/or other circuit elements can be comprised by the h-bridge 205. The switches and/or transistors can be operated, such as via control by the comprising controller 204, such as to facilitate current flow between the external apparatus and the cells 220.

More particularly regarding the comprising controller 204, the controller 204 can be connected by any suitable means, such as communicatively and/or electrically connected, to one or more of the cells 220. In one or more embodiments, the controller 204 can be generally connected to each of the cells 220.

The controller 204 (e.g., controller board) can be welded directly and/or indirectly onto cell poles of the battery cells 220, and the controller 204 can be powered by the battery cells 220. The controller 204 can comprise any suitable components, such as a processor 206, bus 207, and/or memory 208 for monitoring, controlling and/or generally communicating with the cells 220. That is, the cells 220 can be commonly controlled by the same controller 204.

In one or more embodiments, the controller 204 can be connected (e.g., communicatively, electrically, operatively, optically, etc.) to one or more cells 220, and/or to one or more external systems, sources, and/or devices (e.g., classical and/or quantum computing devices, communication devices, etc.) via a network. The network can comprise one or more wired and/or wireless networks, including, but not limited to, a cellular network, a wide area network (WAN) (e.g., the Internet), and/or a local area network (LAN). For example, the battery system 200 can communicate, such as via the controller 204, with one or more external systems, sources, and/or devices, for instance, computing devices using the network, which can comprise virtually any desired wired or wireless technology, including but not limited to: powerline ethernet, wireless fidelity (Wi-Fi), BLUETOOTH®, fiber optic communications, global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example and as described above, controller 206 can thus include hardware (e.g., a central processing unit (CPU), a transceiver, a decoder, an antenna, quantum hardware, a quantum processor, etc.), software (e.g., a set of threads, a set of processes, software in execution, quantum pulse schedule, quantum circuit, quantum gates, etc.) or a combination of hardware and software that facilitates communicating information between battery system 200 and external systems, sources, and/or devices (e.g., computing devices, communication devices, etc.).

Generally, the controller 204 can monitor cell states of the cells 220. Based on the cell states, the controller 204 can determine, such as generate, an order for electrically connecting the cells 220 to an external apparatus for current flow between the external apparatus and the multi-cell battery cluster 202. The order can be a time-based order, such as where certain cells 220 are connected in time prior to, during or after other cells 220. The connection can be for charging and/or discharging of the cells 220. The connection can be made by any suitable component, such as the h-bridge 205 having one or more switches, transistors and/or the like.

To facilitate these one or more operations, the processor 206 can comprise a monitoring component 210, a determination component 212 and/or execution component 216.

Processor 206 can comprise one or more types of processors and/or electronic circuitry (e.g., a classical processor, a quantum processor, etc.) that can implement one or more computer and/or machine readable, writable, and/or executable components and/or instructions that can be stored on memory. For example, the processor 206 can perform various operations that can be specified by such computer and/or machine readable, writable, and/or executable components and/or instructions including, but not limited to, logic, control, input/output (I/O), arithmetic, and/or the like. The processor 206 can comprise one or more central processing unit (CPU), multi-core processor, microprocessor, dual microprocessors, microcontroller, System on a Chip (SOC), array processor, vector processor, quantum processor, and/or another type of processor. Such examples of the processor can be employed to implement any embodiments described herein. In an example embodiment, the processor 206 can comprise a central processing unit (CPU) such as, for example, a microprocessor.

The memory 208 can store one or more computer and/or machine readable, writable, and/or executable components and/or instructions that, when executed by the processor 206 (e.g., a classical processor, a quantum processor, etc.), can facilitate performance of operations defined by the executable component(s) and/or instruction(s). For example, the memory 208 can store computer and/or machine readable, writable, and/or executable components and/or instructions that, when executed by the processor 206, can facilitate execution of the various functions described herein relating to the controller 204, monitoring component 210, determination component 212 and/or execution component 216 as described herein with or without reference to the various figures described herein.

The memory 208 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Such examples of the memory 208 can be employed to implement any embodiments described herein.

Bus 207 can comprise one or more of a memory bus, memory controller, peripheral bus, external bus, local bus, quantum bus and/or another type of bus that can employ one or more bus architectures. One or more of these examples of bus 207 can be employed to implement one or more embodiments described herein.

The monitoring component 210 can perform one or more parameter monitoring tasks on the cells 220. In one or more embodiments, the monitoring component 210 can employ one or more sensors, and/or can employ results from one or more sensors, at the cells 220 such as to measure the one or more parameters. The one or more parameters can include, but are not limited to temperature, charge level, pressure, cell material chemistry, current flow, voltage potential and/or the like.

Likewise, the monitoring component 210 can employ one or more databases, indexes, logs and/or the like, such as stored at the controller 204, memory 208 and/or the like. That is, the monitoring component 210 can analyze data/metadata of such storage locations for historical use information, historical current flow and/or voltage potential information, historical health, temperature, thermal cycling, material degradation and/or pressure information, and/or the like.

In view of one or more of these aforementioned operations, the monitoring component 210 can resultingly monitor the present state of charge (SOC) and/or state of health (SOH) of one or more cells 220 and/of one or more clusters, including the cluster 202. As used herein, SOH can comprise state of swelling, temperature, current/voltage input/output, material composition and/or the like, where SOC can more particularly comprise charge level and historical charge level information.

Regarding cluster-level monitoring and analysis, the battery system 200 can comprise one or more additional multi-cluster battery clusters 252. Cluster-level monitoring can comprise comprehensive collection of information for cells 220 comprised by a cluster 202/252 and/or information can be obtained (e.g., sensors, stored data, logs, etc.) that corresponds to cluster-level SOC and/or SOH. That is, the cell states of the cells 220 can be provided as a function of a cluster state of the multi-cell battery cluster 202/252, and/or vice versa.

In one or more embodiments, the monitoring component 210 can facilitate logging of monitored data collected by one or more sensors and/or by the monitoring component 210. Such data can be stored at memory 208 and/or any other suitable location accessible by the controller 204 and/or by respective controllers of the additional multi-cell battery clusters 252 of the battery system 200.

The execution component 216 can facilitate operation of one or more switches and/or transistors of the h-bridge 205 in response to a determination of which cells 220 and/or which clusters 202/252 to electrically connect to an external apparatus for charging and/or discharging. Alternatively and/or additionally, the execution component 216 can facilitate operation of one or more switches and/or transistors of the h-bridge 205 in response to a determination of which cells 220 and/or which clusters 202/252 to bypass (e.g., to not connect to an external apparatus).

For example, the execution component 216 can facilitate operation of one or more switches to configure the non-limiting system 200 and/or a multi-cell battery cluster 202/252 to operate in one or more operation modes described herein. An h-bridge can use (e.g., draw) electric energy (e.g., electric power, electric current, electric voltage) from the connected battery cells 220. For example, the respective controller, processor and/or memory can be coupled to active cell material via wire traces (e.g., integrated metal wires, striplines, microstrips, etc.) of the controller 204 or of an h-bridge 205 to which the controller 204 can be connected. This can enable the controller 204, processor, memory, one or more sensors, and/or one or more switches to draw electric energy (e.g., electric power, electric current, electric voltage) from one or more connected battery cells 220.

Generally, the h-bridge 205 can be operated, such as by a processor, such as a processor chip of the controller 204, to provide a negative output voltage, a positive output voltage or no output voltage respective at AC output poles. Accordingly, such switches can facilitate different operating modes (e.g., off, positive, negative, bypass, etc.) of a battery cell 220 and/or cluster 202/252 depending on whether the respective h-bridge provides cluster-level or battery-level control, in accordance with one or more embodiments described herein.

Indeed, output polarity from each multi-cell battery cluster 202/252 can be selectively controlled to selectively provide AC voltage output and/or DC voltage output due to the varying of the output polarity. That is, relative to one multi-cell battery cluster 202, a respective controller 204 can provide on of negative output voltage, positive output voltage or no output voltage at a time. Regarding provision of no voltage, a controller 204 can be configured, such as via one or more elements thereof to be described below in detail, to bypass one or more of the battery cells 220 controlled by the controller 204. Additionally, in one or more embodiments of the non-limiting system 200, one or more of the multi-cell battery clusters 202 or 252 can be bypassed while another multi-cell battery cluster 202 or 252 can provide an output voltage or be providing a charging current. In one or more embodiments, two or more, or even all, multi-cell battery clusters can be bypassed to provide less or even no voltage from a respective battery system 200.

Additionally, in one or more embodiments of the non-limiting system 200, each of the multi-cell battery clusters 202 and 252 can comprise an h-bridge, such as the h-bridge 205 of the multi-cell battery cluster 202. In one or more embodiments, additionally and/or alternatively, an h-bridge can control output/input of current/voltage to multiple multi-cell battery clusters 202/252. In one example, such global h-bridge can be comprised by and/or controlled by a global controller 250 that is communicatively connected to each of the multi-cell battery clusters 202 and 252. A global controller, here the global controller 250, can control one or more controllers 204, as will be described in additional detail relative to FIG. 8.

Furthermore, generally, the battery system 200 can be operated to charge one or more battery cells 220, such as of one or more clusters 202/252 of the battery system 200 at a time, and such as without additional transformers, inverters or chargers. That is, the controllers 204 can provide the functions of such additional transformers, inverters and chargers employed in existing systems.

In one or more embodiments, an AC output and a DC output can be provided contemporaneously by the battery system 200. In one or more embodiments, the battery system 200 can be controlled to convert voltage from one or more respective battery cells 220 to a lesser voltage, such as to power one or more auxiliary systems of a vehicle, such as panels, lights, AC chargers, and/or the like. This can be accomplished absent use of transformers, inverters and/or chargers separate from the battery system 200, and indeed without such elements other than at the battery controller 204 in one or more embodiments.

The plural clusters 202/252 of the battery system 200 can communicate with one another via any suitable method. In one embodiment, wireless communication can be provided by the separate controllers 204.

Furthermore, generally, the battery system 200 can be operated to charge or discharge one or more battery cells 220 at a time, and such as without additional transformers, inverters or chargers.

In one or more embodiments, selective charging of one or more cells 220 can be performed simultaneously with selective discharging of one or more other cells of the same or different multi-cell battery cluster 202/252 of the battery system 200 (e.g., multi-cluster battery system).

Turning now to FIGS. 3 to 7, three variations of employment of the controller 204 and/or of the execution component 216 of the multi-cell battery cluster 202 are illustrated. These figures illustrate charging, discharging and bypass operations of a pair of series-connected cells 220 of the cluster 202.

Figure 3:
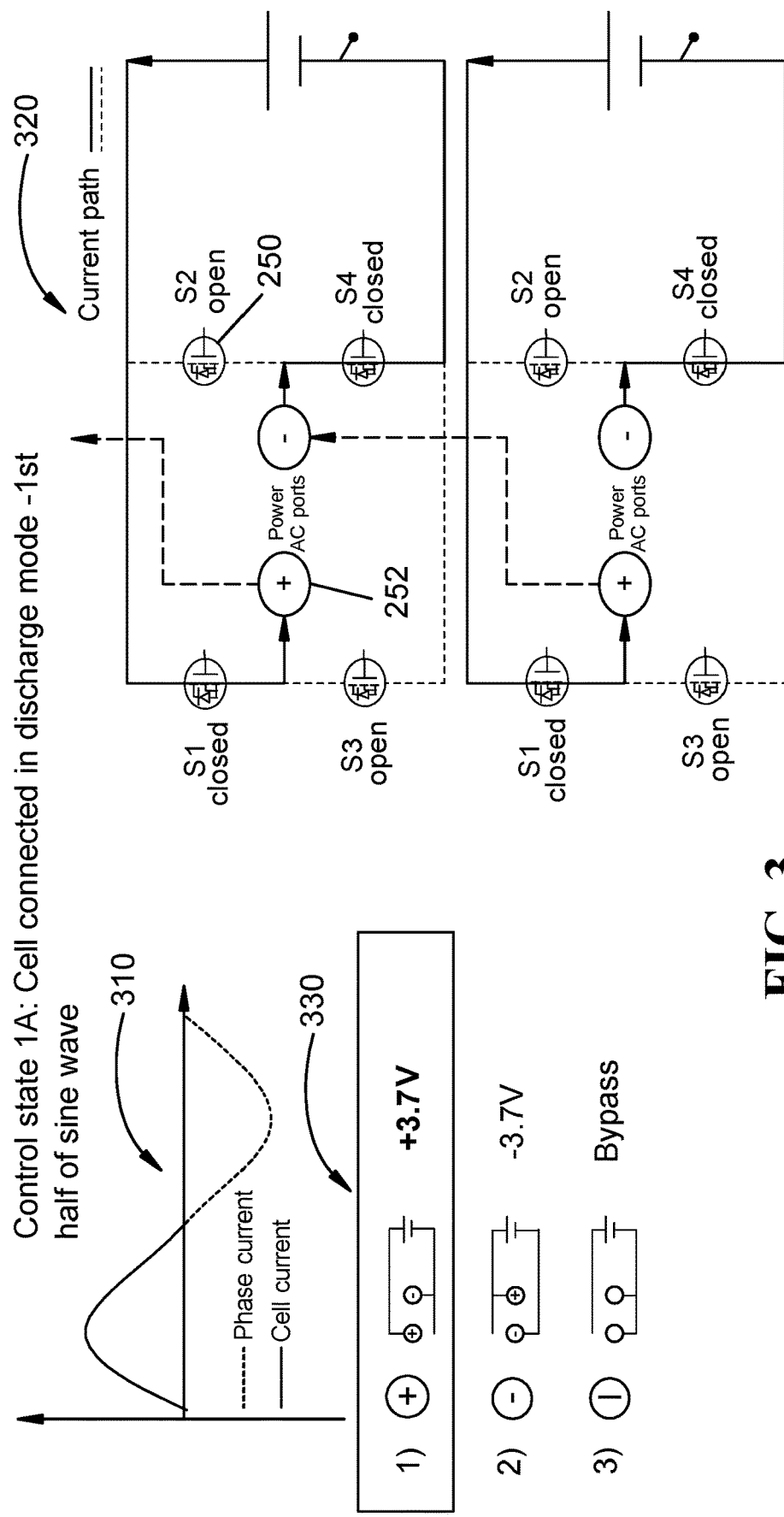
FIG. 3 provides an illustration of a discharge mode of the battery system of FIG. 2, in accordance with one or more embodiments described herein.
Figure 4:
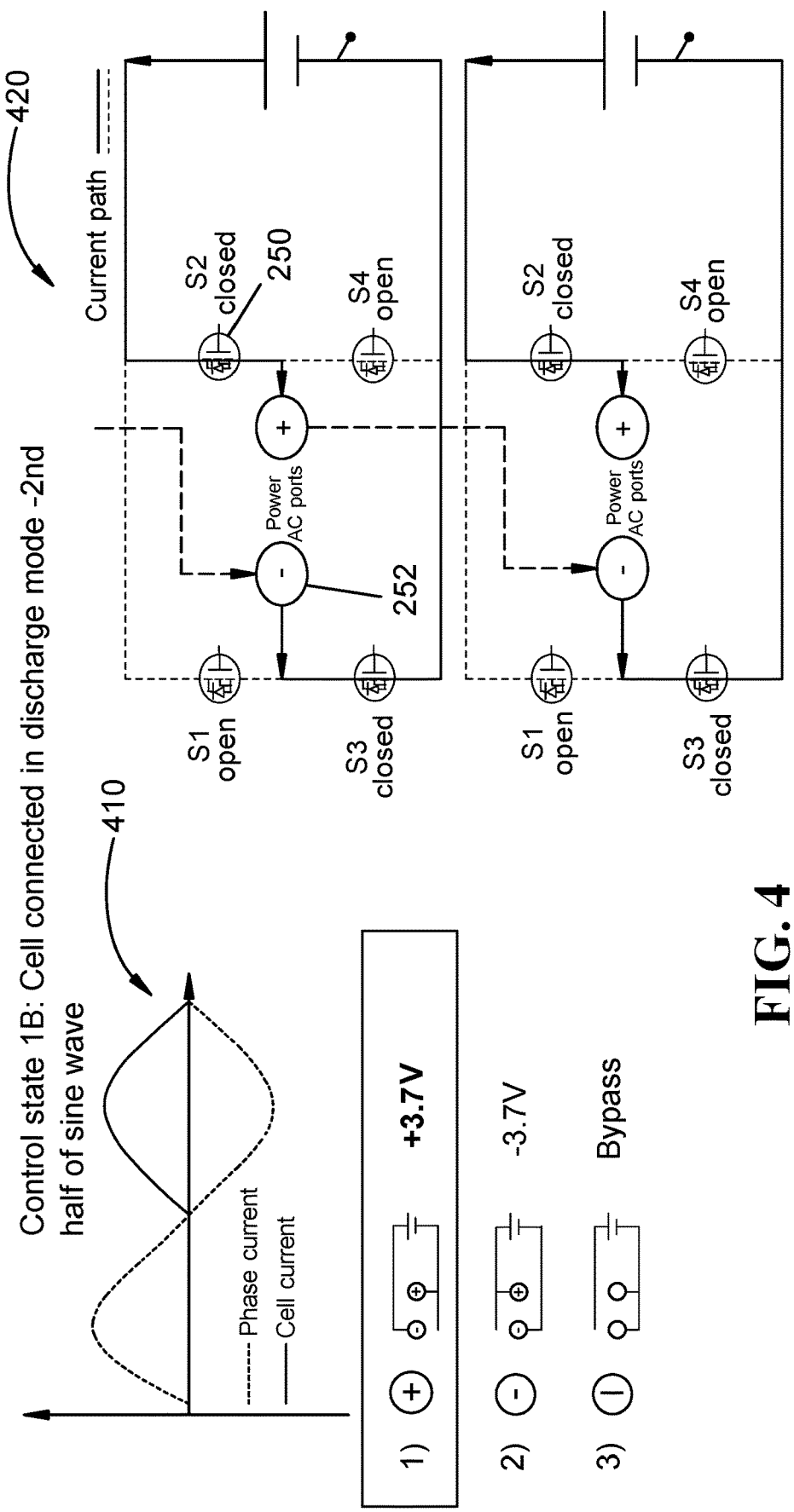
FIG. 4 provides another illustration of the discharge mode of the battery system of FIG. 2, in accordance with one or more embodiments described herein.

At FIGS. 3 and 4, first and second consecutive portions of a discharge mode are illustrated. That is, the cells 220 depicted are being discharged such that they are providing power to an external apparatus. Connection to the external apparatus can be by way of the h-bridge or at cluster-level control.

These figures include a graphical representation 310 and 410 of a repeated phase current and a cell current during discharge (y-axis) vs. time (x-axis), and also an electrical schematical illustration 320 and 420 of two cells 220. As shown, each of the two cells 220 comprises an h-bridge 205 having a set of 4 switches 250. Via control by the controller 204 and/or execution portion 216, the switches 250 can be activated (e.g., closed) to variably control the cell current through the switches 250 for discharging of the cells 220. The phase current passes in series between AC power ports 252 of the series-connected cell 220 of a multi-cell battery cluster 202.

At FIG. 3, at the first half of the illustrated sine wave, cell current is positive and passes through closed (to external)

switches 250 S1 and S4 for each cell 220. At the first half of the illustrated sine wave, phase current also is positive. As represented at diagram 330 a +3.7 volts (V) is being provided by each cell 220.

At FIG. 4, at the second half of the illustrated sine wave, cell current remains positive and passes in an opposite direction between closed switches 250 S2 and S3. Phase current also is reversed. That is, by activating the switches continuously, an AC current can be provided to power an external apparatus.

Figure 5:
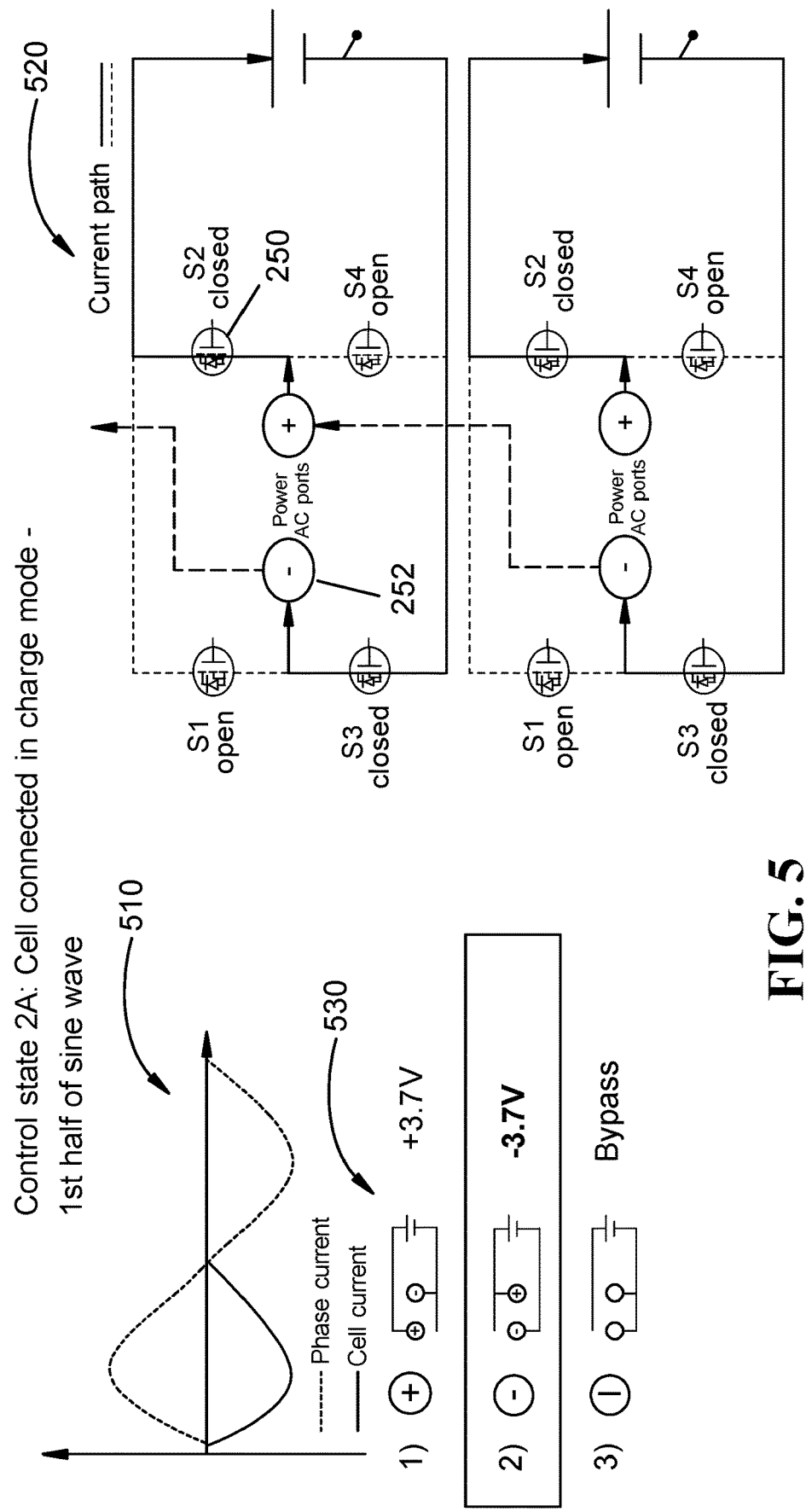
FIG. 5 provides an illustration of a charge mode of the battery system of FIG. 2, in accordance with one or more embodiments described herein.
Figure 6:
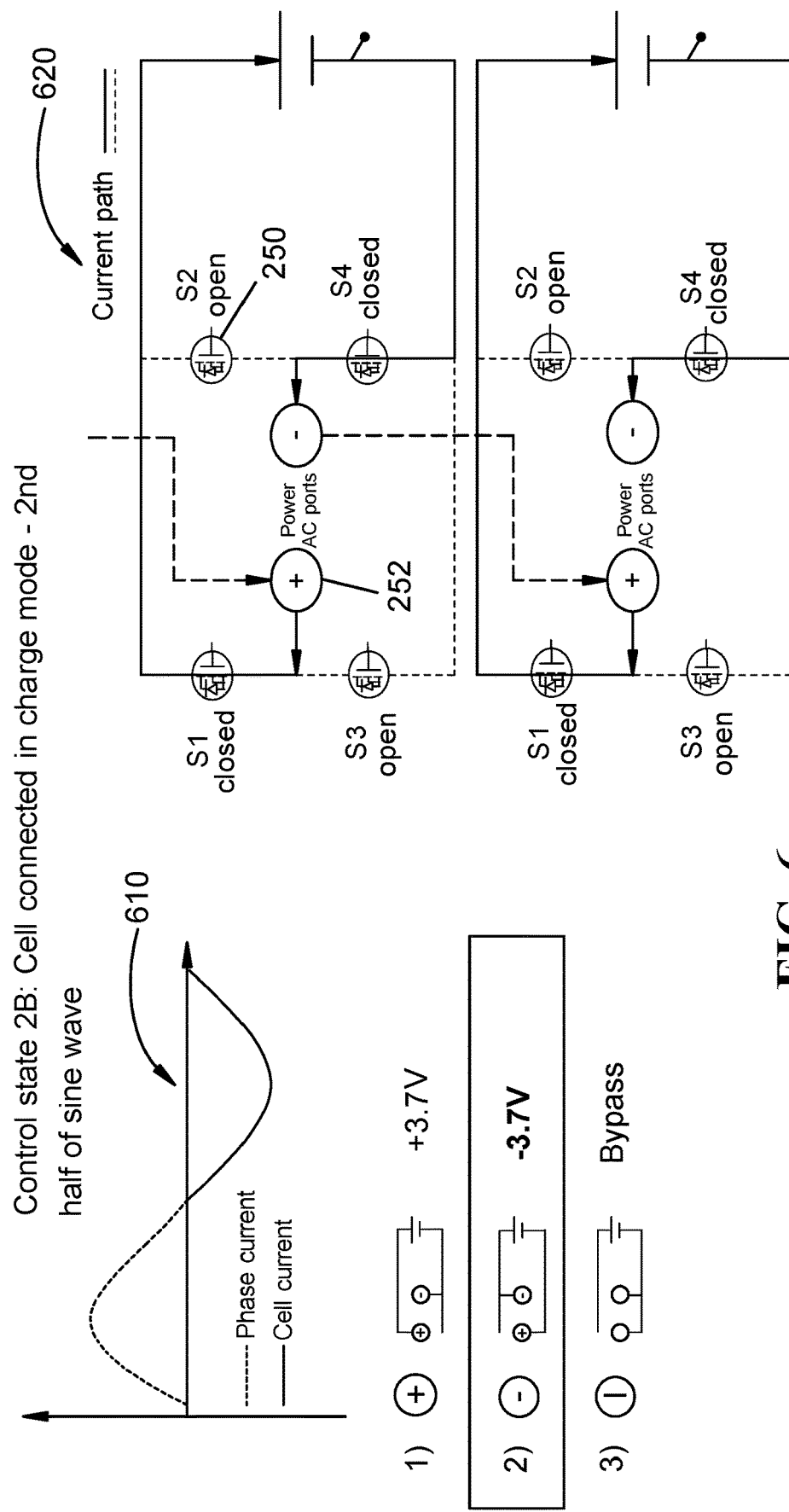
FIG. 6 provides another illustration of the charge mode of the battery system of FIG. 2, in accordance with one or more embodiments described herein.

Looking now to FIGS. 5 and 6, first and second consecutive portions of a charge mode are illustrated. That is, the cells 220 depicted are being charged in view of connection to an external apparatus. Connection to the external apparatus can be by way of the h-bridge or at cluster-level control.

These figures include a graphical representation 510 and 610 of a repeated phase current and a cell current during discharge (x-axis) vs. time (y-axis), and also an electrical schematical illustration 520 and 620 of two cells 220. Via control by the controller 204 and/or execution portion 216, the switches 250 can be activated (e.g., closed) to variably control the cell current through the switches 250 for charging of the cells 220. The phase current passes in series between AC power ports 252 of the series-connected cell 220 of a multi-cell battery cluster 202.

At. FIG. 5, at the first half of the illustrated sine wave, cell current is negative and passes through closed switches 250 S3 and S2 for each cell 220. At the first half of the illustrated sine wave, phase current also is positive. As represented at diagram 530 the cell 220 is measured at −3.7 volts (V).

At FIG. 6, at the second half of the illustrated sine wave, cell current remains positive and passes in an opposite direction between closed switches 250 S1 and S4. Phase current also is reversed. That is, by activating the switches continuously, the cells 220 can be charged.

Figure 7:
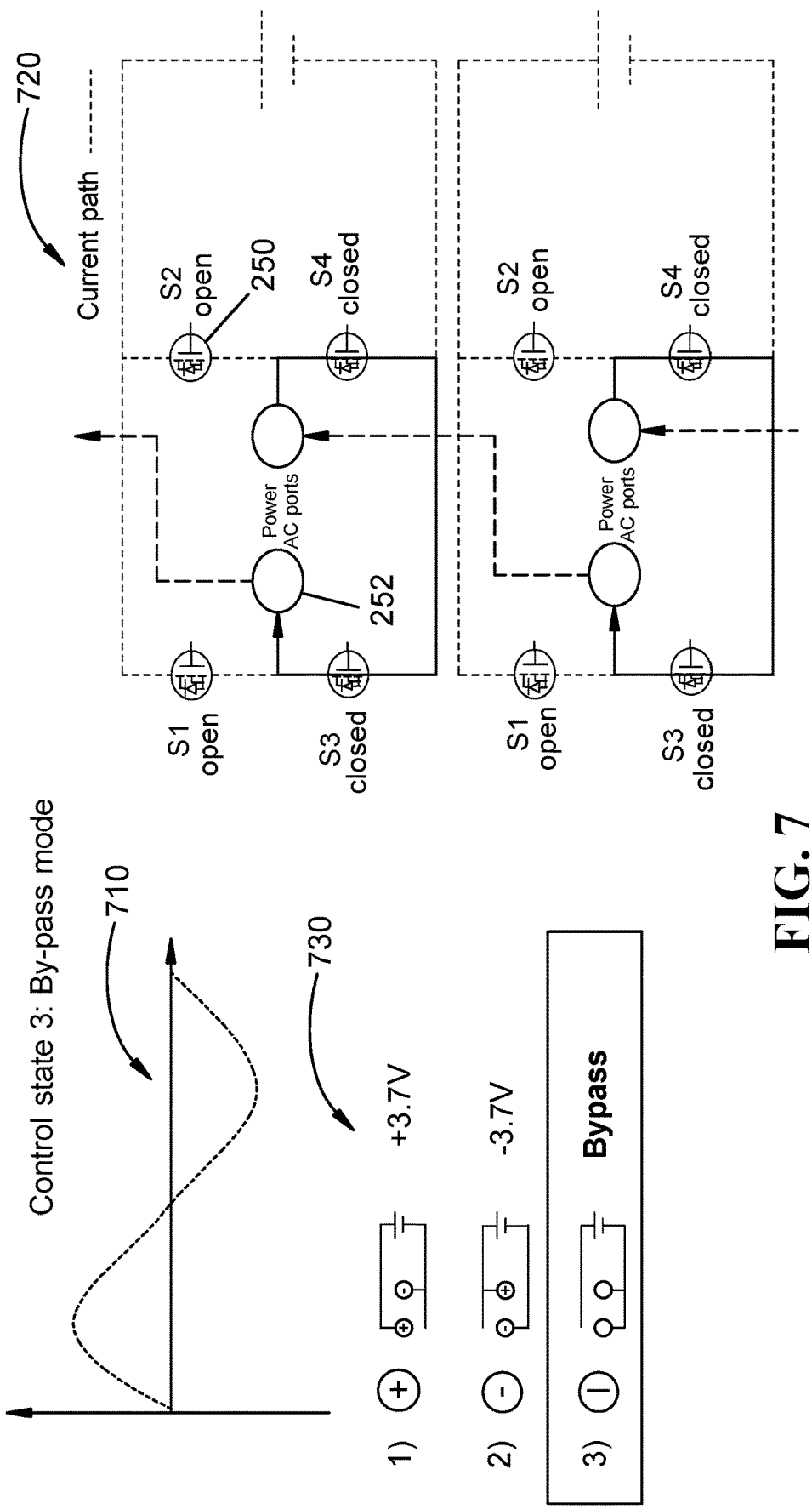
FIG. 7 provides an illustration of a bypass mode of the battery system of FIG. 2, in accordance with one or more embodiments described herein.

Looking next to FIG. 7, illustrated are representations defining a bypass mode of the cells 220 depicted. A graphical representation 710 depicts 0 cell current and the phase current during the bypass mode. The electrical schematical illustration 720 depicts both switches 250 S3 and S4 being closed for the bypass mode. That is, cell current is not passing between the cells 220, as indicated at representation 730.

Turning now again to FIG. 2, and turning now to the determination component 212, in one or more embodiments, the determination component 212 can provide one or more orders (e.g., priority listings) of units (e.g., cells and/or clusters) to be charged, discharged and/or bypassed based on the aforementioned control techniques. One or more orders can be generated contemporaneously by the determination component 212, which orders can be different and/or can be based on different information.

The time-based order can be at least partially based on an information output, analysis and/or prediction made by the monitoring component 210. That is, a time-based order can be at least partially based on an information output, analysis and/or prediction made by the monitoring component 210. In one or more embodiments, based on information output from the monitoring component 210, the determination component 212 can make one or more predictions, such as relative to cell degeneration, for example. As discussed above, the one or more parameters, without being limiting, can comprise temperature, charge level, pressure, cell material chemistry, current flow, voltage potential, historical temperature variation, historical charge level variation and/or any other historical data.

Further, an order of priority of clusters can be based upon an order of priority of cells. For example, cells of a first cluster can have first priority, and cells of a second cluster can have second priority. The cells of the first cluster or the second cluster can have generally parallel priority and/or one or more cells of a cluster can have a series-ordered-priority. Parallel priority can refer to charging/discharging cells at a same time. Series-ordered-priority can refer to charging one or more cells before charging/discharging one or more other cells.

Briefly, the time-based order of use (e.g. charging/discharging) is indicated as "time-based" because one or more first cells are used and/or connected to an external apparatus in time before one or more other cells. Again, such order can refer to cluster order where the one or more first cells are of a first cluster and are used and/or connected to an external apparatus in time before the one or more other cells being of another cluster.

The time-based order can be a single-file list and/or can employ groupings in units. A single-file list can be employed with a series order and/or a parallel order (such as where one or more units can be charged/and or discharged at least partially at the same time). For example, cells listed as 1-4 in an order can all be charged in parallel before cells listed as 5-8 in the order.

Because the order(s) can be generated based on results output from the monitoring component 210, the orders can be based on one or more different control strategies. The control strategies can include control for cell/cluster charge optimization, such as allowing for cell/cluster charge balancing across a cluster, a string, or an entire battery system. These control strategies also can include control for cell/cluster health optimization. Further, but not being limited to these control strategies only, the control strategies can include a combined charge and health optimization strategy. Any one or more of the control strategies can be employed at a time. Any of the control strategies can be employed relative to charging or discharging, to thus achieve the optimum cell/cluster charge and/or health.

To achieve any one of the one or more above-discussed control strategies, in one or more embodiments, the determination component 212 can comprise and/or employ one or more machine learning (ML) and/or artificial intelligence (AI) models to learn, for instance, one or more operating conditions and/or cause and effect conditions corresponding to one or more cells 220, clusters 202/252 and/or an external device apparatus connected to the battery system 200. In these embodiments, based on learning such one or more operating conditions and/or cause and effect conditions, the processor 206 further can employ the one or more ML and/or AI models to perform one or more tasks including, but not limited to, making a prediction, making an estimation (e.g., cell capacity (e.g., electric energy) of active cell material), classifying data, implementing one or more monitoring and/or control operations of the controller 204, and/or another task. In some embodiments, such a machine learning model can comprise a machine learning model based on artificial intelligence (AI) including, but not limited to, a shallow or deep neural network model, a support vector machine (SVM) model, a classifier, a decision tree classifier, a regression model, and/or any supervised or unsupervised machine learning model that can perform the operations of the machine learning component described above.

Indeed, the time-based order can be based on state of charge and/or on state of health information output from the monitoring component 210. Each of these different strategies will now be discussed below in further detail.

In one or more cases, state of charge information can be employed by the determination component 212. Regardless of initial state of charge of a battery unit (cell/cluster) prior to order determination, SOC information can be employed, and an order can be determined to optimize cell charge. Optimization can include balancing charge (e.g., achieving a common charge level) across one or more, such as all, units (cell/cluster). Optimization can include achieving higher performance by first using units having higher charge. In one or more cases, optimization can include bypassing one or more cells and/or clusters, such as based on a present low SOC.

Figure 8:
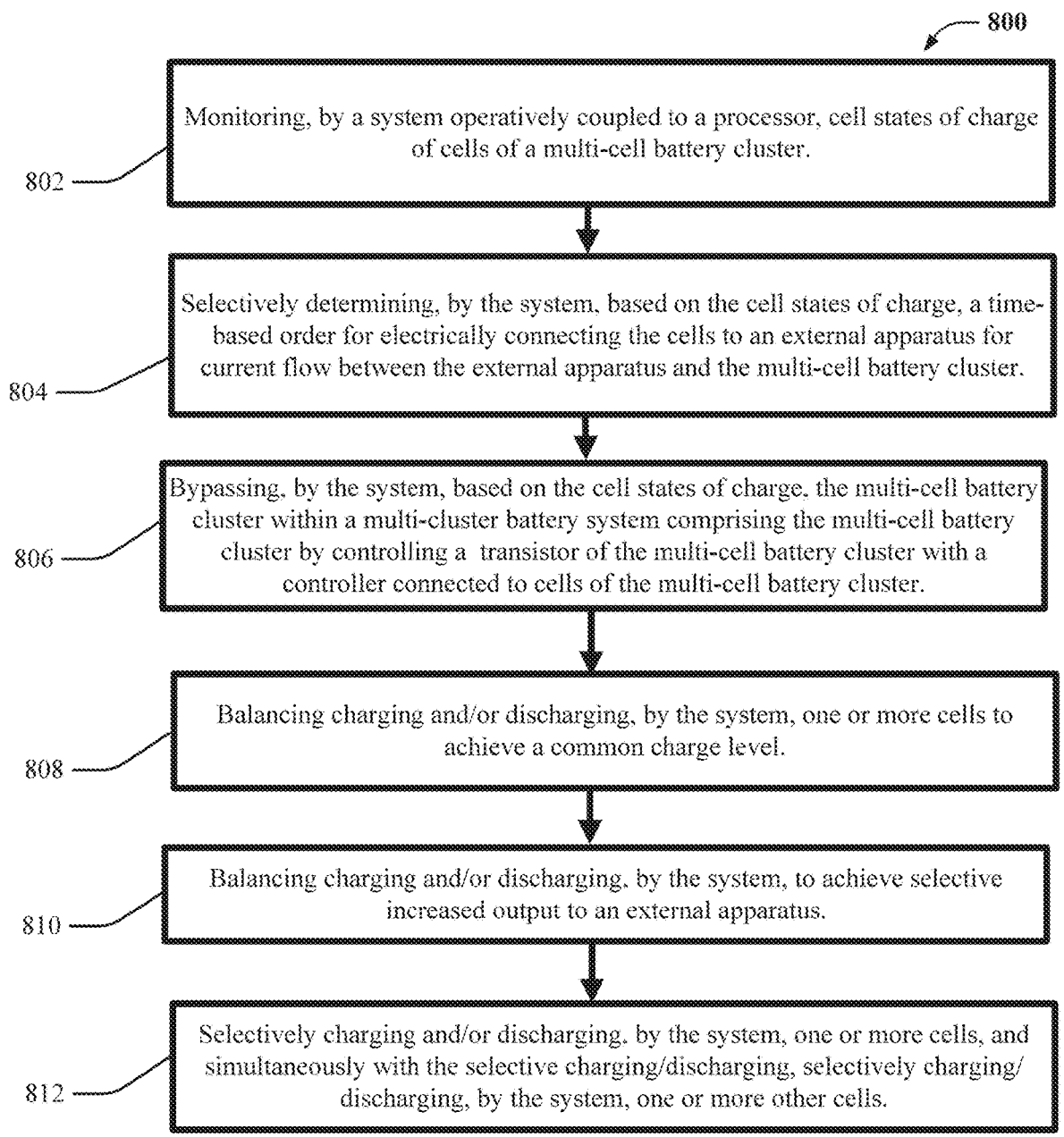
FIG. 8 a process flow of a method of use of a multi-cell battery cluster, in accordance with one or more embodiments described herein.

Turning now to FIG. 8, illustrated is a flow diagram of an example, non-limiting device-implemented method 800 that can facilitate charging and/or discharging one or more units (e.g., cells and/or multi-cell clusters) in a selectively determined order based on SOC monitoring, in accordance with one or more embodiments described herein. Repetitive description of like elements employed in one or more other embodiments described herein is omitted for sake of brevity.

At 802, the system-implemented method 800 can comprise monitoring, by a system operatively coupled to a processor (e.g., monitoring component 210), cell states of charge of cells of a multi-cell battery cluster.

At 804, the system-implemented method 800 can comprise selectively determining, by the system (e.g., determination component 212), based on the cell states of charge, a time-based order for electrically connecting the cells to an external apparatus for current flow between the external apparatus and the multi-cell battery cluster.

At 806, the system-implemented method 800 can comprise bypassing, by the system (e.g., execution component 216), based on the cell states of charge, the multi-cell battery cluster within a multi-cluster battery system comprising the multi-cell battery cluster by controlling a transistor of the multi-cell battery cluster with a controller connected to cells of the multi-cell battery cluster.

At 808, the system-implemented method 800 can comprise balancing charging and/or discharging, by the system (e.g., execution component 216), one or more cells to achieve a common charge level.

At 810 the system-implemented method 800 can comprise balancing charging and/or discharging, by the system (e.g., execution component 216), to achieve selective increased output to an external apparatus.

At 812, the system-implemented method 800 can comprise selectively charging and/or discharging, by the system (e.g., execution component 216), one or more cells, and simultaneously with the selective charging/discharging, selectively charging/discharging, by the system, one or more other cells.

Figure 9:
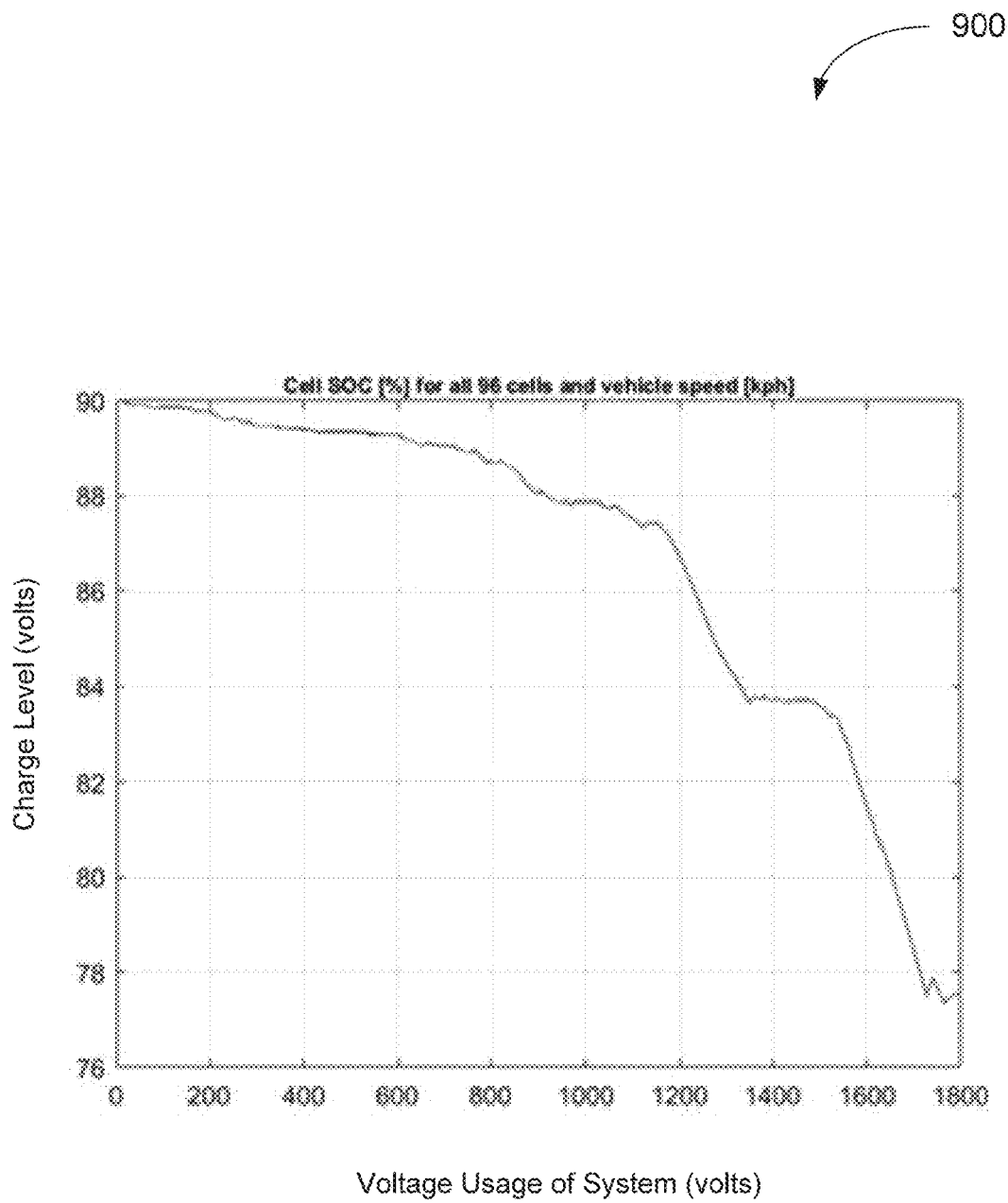
FIG. 9 provides a graph of battery cell usage, in accordance with one or more embodiments described herein.

Turning now to FIG. 9, a graph 900 is illustrated demonstrating state of charge (SOC) on the y-axis vs. number of cycles of use performed on the x-axis. Illustrated is such information for a plurality of cells having a common initial and high state of charge of 90%. Indeed, due to load balancing of the plurality of cells, standard deviation of SOC between the cells is low, as evidenced by the tight illustration of graph lines for the plurality of cells. That is all cells have followed a common trajectory due to the active balancing. As a result, after cell usage, the plurality of cells have common lower charge.

Figure 10:
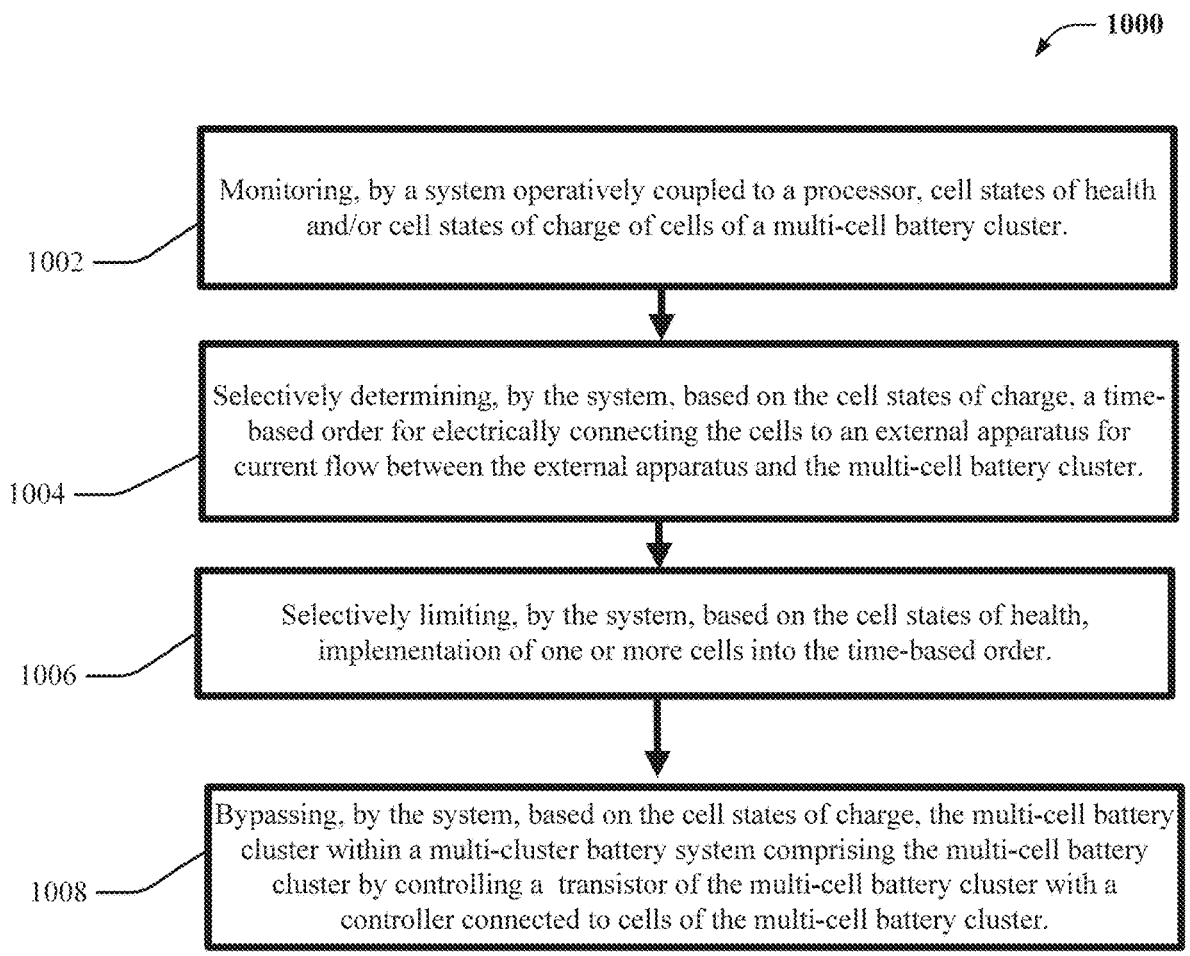
FIG. 10 illustrates a process flow of another method of use of a multi-cell battery cluster, in accordance with one or more embodiments described herein.
Figure 11:
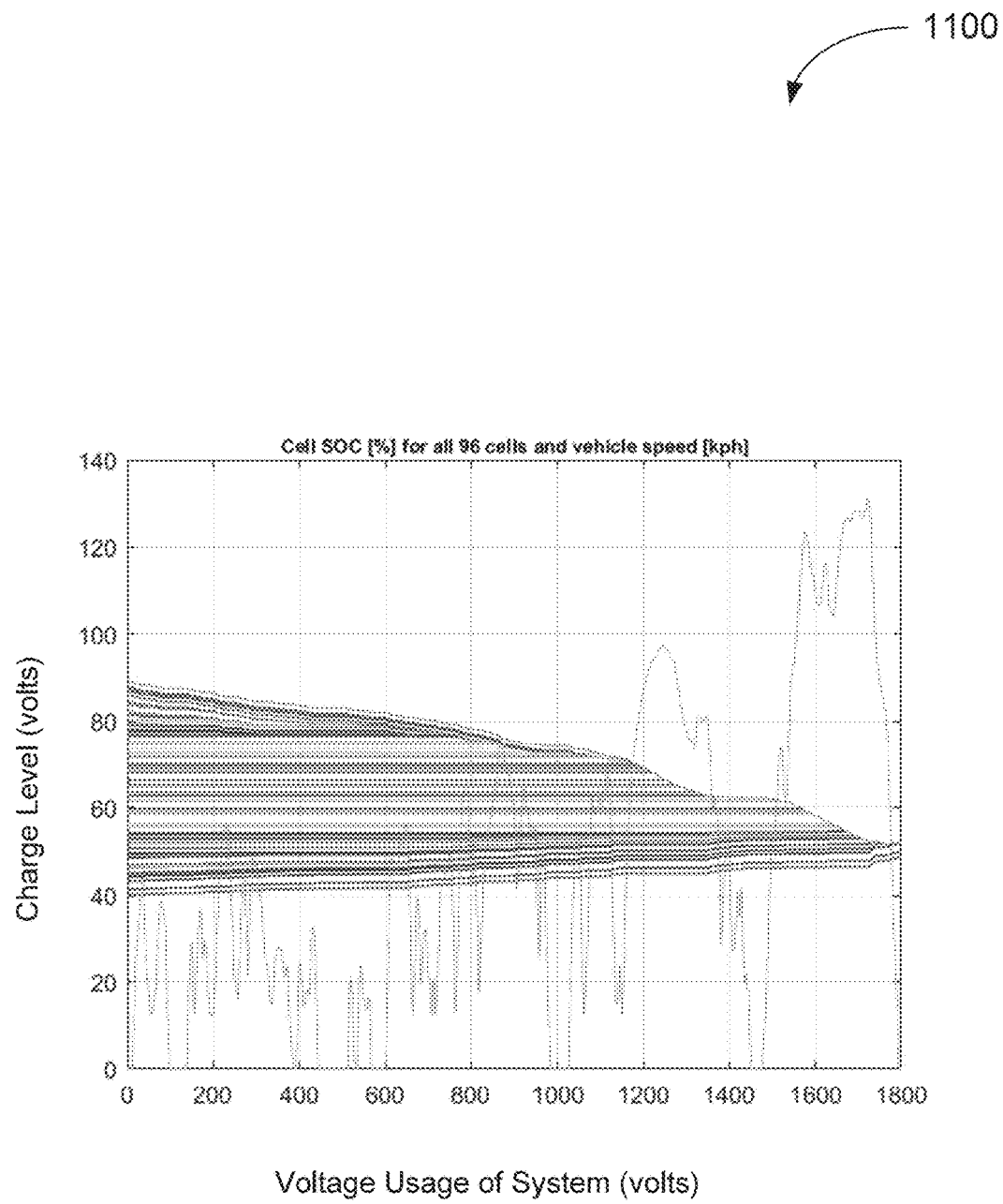
FIG. 11 provides a graph of battery cell charge and discharge, in accordance with one or more embodiments described herein.

Turning now to FIGS. 10 and 11, alternatively, in one or more cases, state of health information can be employed by the determination component 212. Regardless of initial state of health of a battery unit (cell/cluster) prior to order determination, SOH information can be employed, and an order can be determined to optimize cell charge. Optimization can include balancing health (e.g., achieving a common charge level) across one or more, such as all, units (cell/cluster). Optimization can include bypassing and/or performing reduced charging and/or discharging of one or more cells determined as having a lower health as compared to other one or more cells and/or as compared to a baseline and/or selectively determined health threshold. As indicated above, such state of health can be based on any one or more of temperature, charge level, pressure, cell material chemistry, current flow, voltage potential, historical use information, historical current flow and/or voltage potential information, historical health, temperature, thermal cycling, material degradation and/or pressure information, and/or the like. In one or more cases, optimization can include bypassing one or more cells and/or clusters, such as based on a present low SOH.

Furthermore, in one or more cases, both state of health information and state of charge information can be employed by the determination component 212. Indeed, an order employing SOC information can be limited by present SOH information for one or more units. That is, in one example, ordered charging and/or discharging can be based on SOC information obtained from the monitoring component 210, but order of charge/discharge can include only those units (cells/clusters) meeting a selectively determined threshold of health. As used herein, such selectively determined threshold can be determined by a user entity and/or by a controller (e.g., controller 204). That is, in one or more cases, optimization can include bypassing one or more cells and/or clusters, such as based on current low SOH.

Turning now to FIG. 10, illustrated is a flow diagram of an example, non-limiting device-implemented method 1000 that can facilitate charging and/or discharging one or more units (e.g., cells and/or multi-cell clusters) in a selectively determined order based at least in part on state of charge monitoring, in accordance with one or more embodiments described herein. Repetitive description of like elements employed in one or more other embodiments described herein is omitted for sake of brevity.

At 1002, the system-implemented method 1000 can comprise monitoring, by a system operatively coupled to a processor, cell states of health and/or cell states of charge of cells of a multi-cell battery cluster.

At 1004, the system-implemented method 1000 can comprise selectively determining, by the system, based on the cell states of charge, a time-based order for electrically connecting the cells to an external apparatus for current flow between the external apparatus and the multi-cell battery cluster.

At 1006, the system-implemented method 1000 can comprise selectively limiting, by the system, based on the cell states of health, implementation of one or more cells into the time-based order.

At 1008, the system-implemented method 1000 can comprise bypassing, by the system, based on the cell states of charge, the multi-cell battery cluster within a multi-cluster battery system comprising the multi-cell battery cluster by controlling a transistor of the multi-cell battery cluster with a controller connected to cells of the multi-cell battery cluster.

Turning now to FIG. 11, a graph 1100 is illustrated demonstrating state of health information use for balancing charge level (SOC). SOC is presented on the y-axis vs. voltage usage on the x-axis. As illustrated, a deviation is depicted between initial SOC of cells. At the end of usage, a majority of cells have a same and/or common range of SOC. That is, overtime, during use discharging and charging of the cells, SOC has been balanced, such as by employing a lower usage of one or more cells due to respective SOH information from monitoring of those one or more cells.

Figure 12:
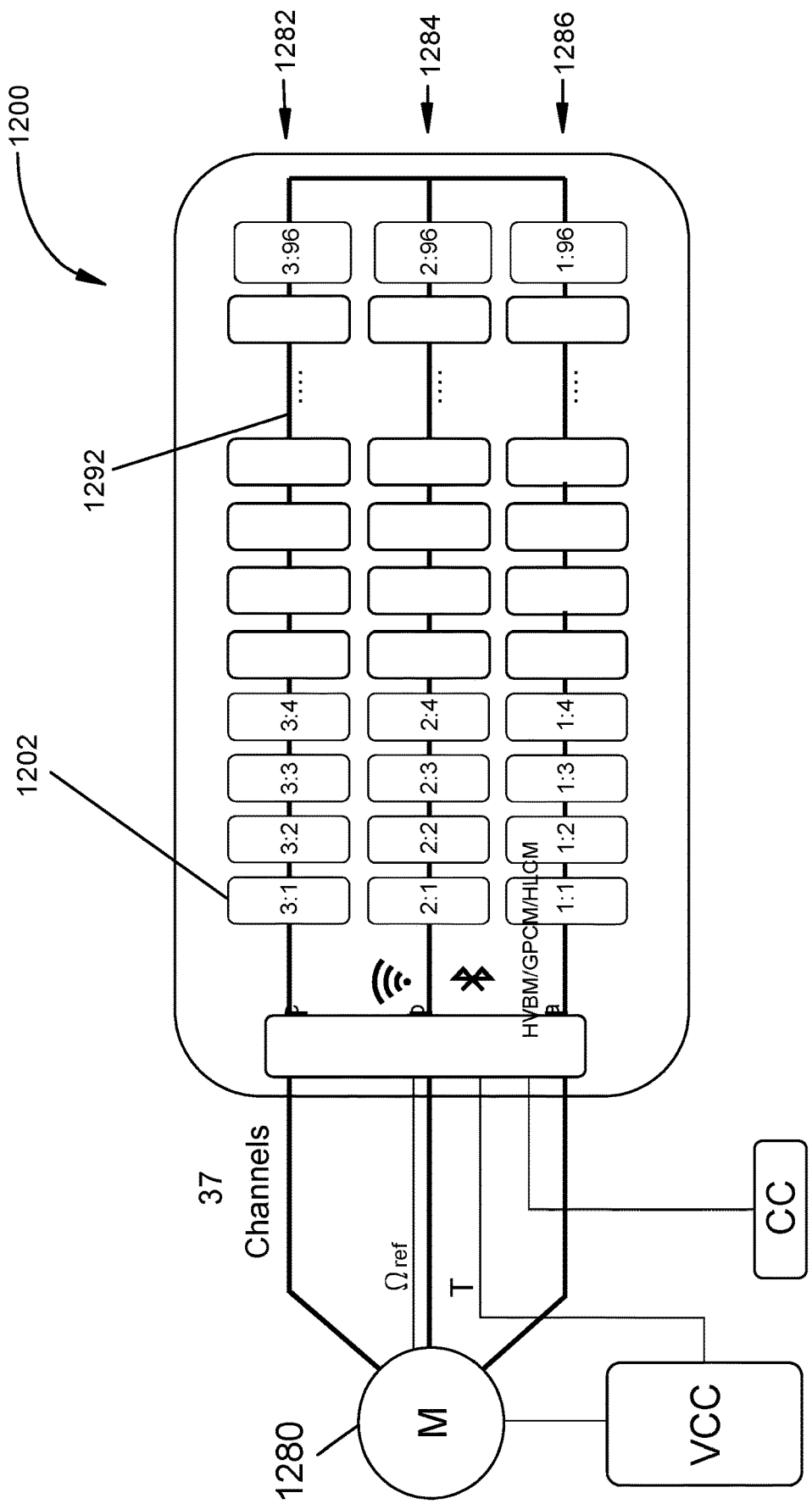
FIG. 12 illustrates a schematic view of another battery system, in accordance with one or more embodiments described herein.

Referring next to FIG. 12, another depiction is provided of an exemplary battery system 1200 (e.g., multi-cluster battery system or multi-string battery system), in accordance with the aforementioned description regarding battery device, battery cells, battery systems and controller. Repetitive description of like elements employed in one or more other embodiments described herein is omitted for sake of brevity.

The battery system 1200 can comprise a vehicle central controller (VCC) and a charge controller (CC). The battery system 1200 also can comprise three strings 1282, 1284 and 1286 of multi-cell clusters 1202. Each multi-cell cluster 1202 can have a different number and can be identified, such as by a respective controller and/or processor by the string number and device number, such as string: device or 3:96. Each of the clusters 1202 within each separate string can be connected to one another, such as via a string bridge 1292 connected to respective AC poles of the respective controllers of the clusters 1202. Each string 1282, 1284 and 1286 can be connected, such as communicatively connected wirelessly, to a global controller 1280.

In one or more embodiments, one or more "multi"-cell clusters can be capable of comprising more than one cell, but can at one or more instances comprise only a single battery cell.

Referring now to the battery system 1200 generally, the battery system 1200 can vary output polarity from one or more cells, such as a multi-cell battery cluster, to selectively provide one or both of alternating current (AC) voltage output or direct current (DC) voltage output from the battery system due to the varying of the output polarity. To provide the AC voltage output and/or DC voltage output, the local controllers, e.g., of the individual clusters 1202, can selectively separately provide negative output voltage, positive output voltage and no output voltage. That is, relative to one cluster 1202, a respective controller can provide on of negative output voltage, positive output voltage or no output voltage at a time. Regarding provision of no voltage, a controller can be configured, such as via one or more elements thereof to be described below in detail, to bypass one or more of the battery cells controlled by the respective controller. Further, relative to a multi-cell battery cluster 1202 of the battery system 1200, one multi-cell battery cluster 1202 can by bypassed while another multi-cell battery cluster 1202 can provide an output voltage or be provided a charging current. In one or more embodiments, two or more, or even all, multi-cell battery clusters 1202 can be bypassed to provide less or even no voltage from a respective battery system 1200. In one or more embodiments, an entire string 1282, 1284 or 1286 can be bypassed.

In one or more embodiments, the global controller 1280 can control and/or manage the local controllers. The strings 1282, 1284 and 1286 can be controlled by the global controller 1280 to provide a three phase current source via a parallel coupling of the battery cell strings. Accordingly, an output, represented as a three phase sinusoidal output, can be provided, such as to generate a rotating magnetic field for operation of a motor, such as a motor driving one or more axles, gears and/or wheels of a vehicle. Indeed, in one or more embodiments, one or more motors can be controlled directly by such expanded battery system. That is, such direct control can be implemented absent employment of additional inverters, transformers, chargers and/or other components typically implements in existing technologies comprising constant voltage DC batteries.

Furthermore, similar to the battery system 200, the battery system 1200 can be operated to charge or discharge one or more battery cells at a time, and such as without additional transformers, inverters or chargers.

In one or more embodiments, selective charging of one or more cells can be performed simultaneously with selective discharging of one or more other cells of the same or different multi-cell battery cluster 1202 of the battery system 1200 (e.g., multi-cluster battery system or multi-string battery system).

In one or more embodiments, an AC output and a DC output can be provided contemporaneously by the battery system 1200. In one or more embodiments, the battery system 1200 can be controlled to convert voltage from one or more respective battery cells to a lesser voltage, such as to power one or more auxiliary systems of a vehicle, such as panels, lights, AC chargers, and/or the like.

In one or more embodiments, clusters 1202 and/or cells can be employed based on a charge level and/or health level of the respective clusters or battery cells, such as employing clusters 1202 and/or battery cells having cells with a highest combined charge first. As indicated above, cluster-level and/or battery cell-level order can be employed, such as by the local controllers and/or by the global controller 1280.

Figure 13:
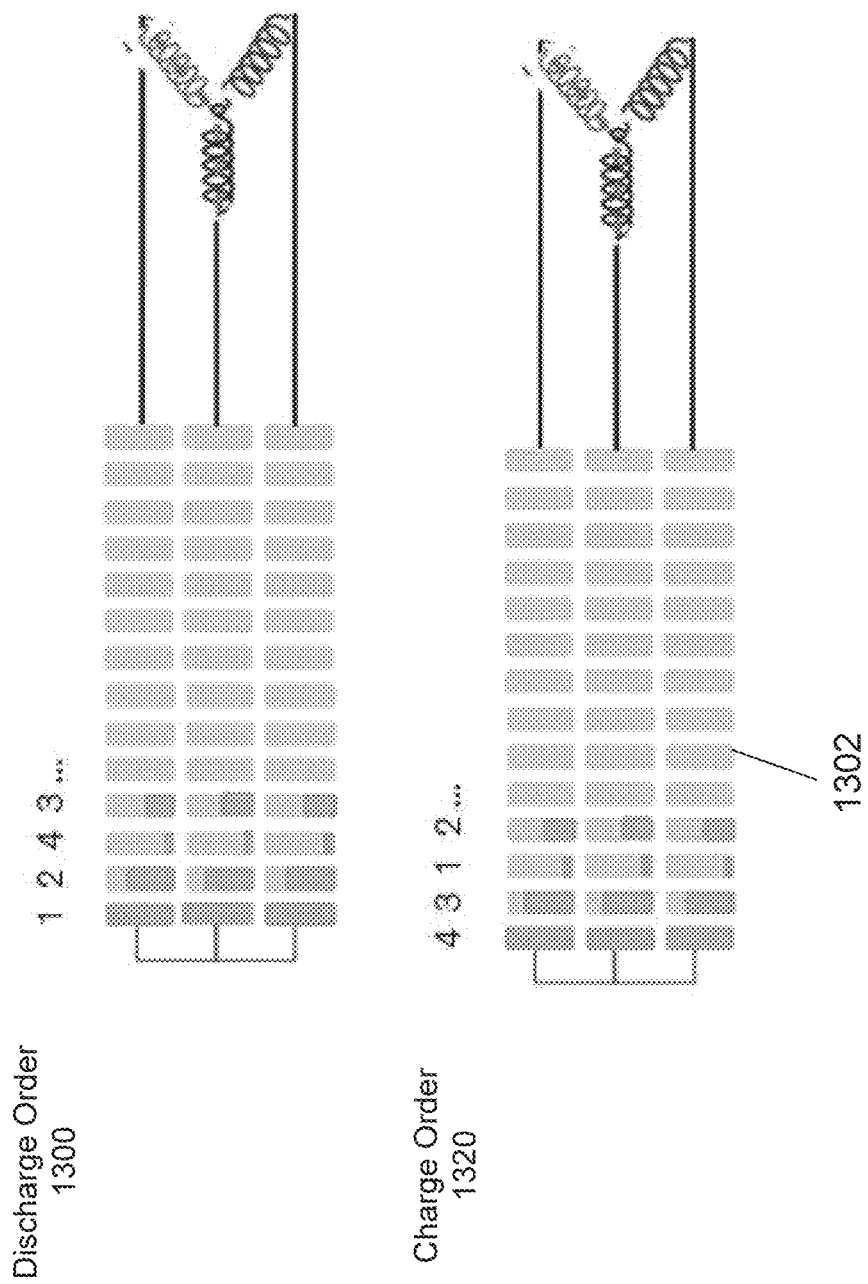
FIG. 13 illustrates a priority order diagram of the battery system of FIG. 12, in accordance with one or more embodiments described herein.

For example, as depicted at FIG. 13, a priority order can be determined, such as by a respective determination component of the global controller 1280, on a string-level basis. In one or more embodiments, as shown, each string can be operated according to a same charge and/or discharge priority. As shown, discharge order at representation 1300 and/or charge order at representation 1320 can be based on a different order than the physical series-connected order of a string. For example, at representation 1300, although cells a, b, c and d can be connected in series in that order, discharge order can be a, b, d, c.

In one embodiment, the boxes 1302 at the strings at FIG. 13 can represent multi-cell battery clusters. In another embodiment, the boxes 1302 at the strings at FIG. 13 can represent individual battery cells. That is, the priority order for either of discharging and/or charging can be provided at a cell-level or at a cluster-level. Furthermore, in one or more embodiments, both cell-level and cluster-level priority (e.g., order) can be determined, such as by the determination component and employed. For example, a high level priority can comprise a cluster level order. The cluster level order can be the same or common for each string. In one or more clusters, a lower level priority can comprise a cell level priority. Different clusters can employ different cell level priorities, such as depending on SOH or SOC of the respective calls.

Figure 14:
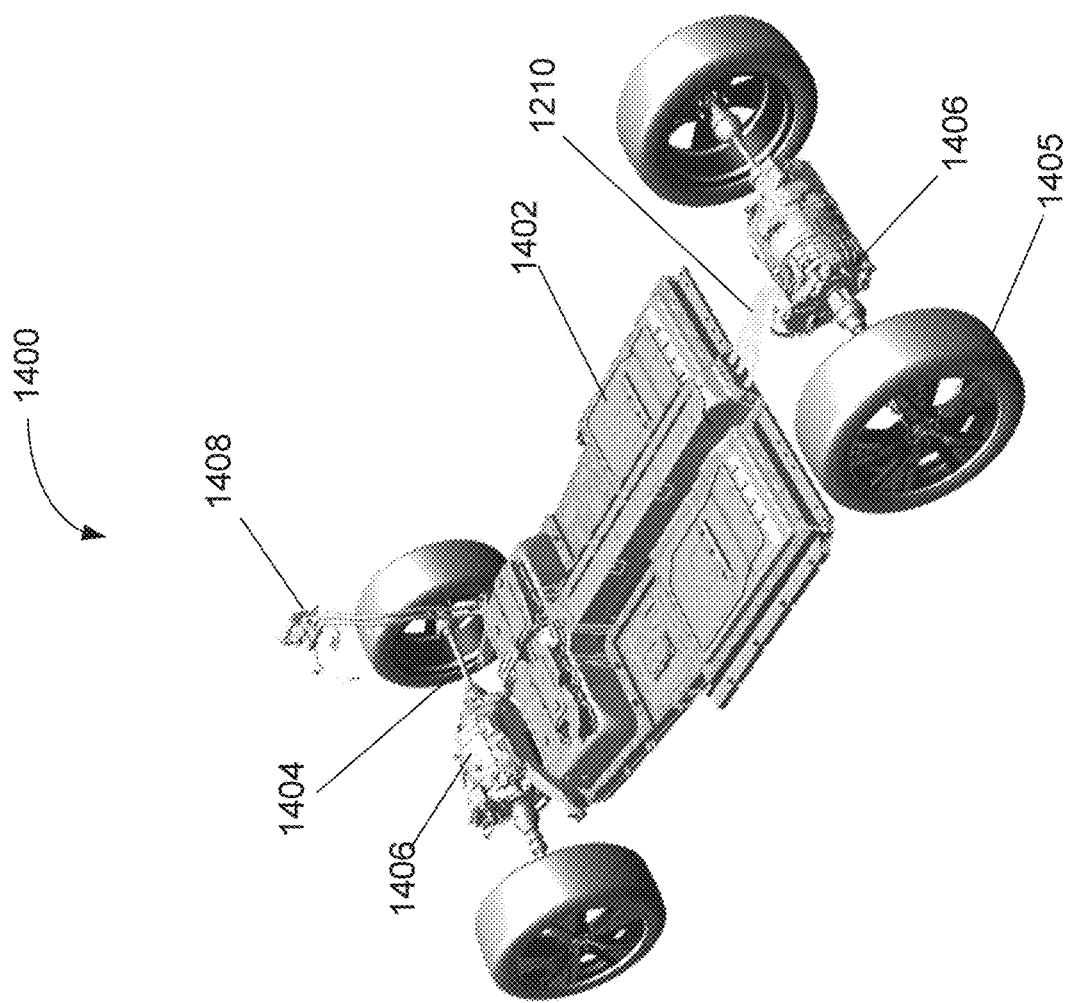
FIG. 14 illustrates an orthogonal view of a partial vehicle, in accordance with one or more embodiments described herein.

Turning now to FIG. 14, a portion of a vehicle 1400 is illustrated. The vehicle 1400 comprises a body portion 1402, a pair of axles 1404 and wheels 1405 connected to the axles 1404 for driving movement of the body portion 1402. Rotation of the axles 1404 can be driven by a pair of motors 1406, such as traction motors, that can be directly controlled by a global controller 1408 connected to the motors 1406 by one or more connectors 1410, such as wires, cables and/or the like. While not shown, the global controller 1408 can control a battery system, such as the battery system 200 or battery system 1200, such as controlling local controllers of such battery system, cell level and/or cluster level controllers. As such, the battery system, via the connectors 1410 and/or other connectors, also such as wires, cables and/or the like, can provide power, such as in a form of AC voltage for driving the motors 1406.

Such battery system can, in one or more embodiments, provide varying levels of AC output voltage for driving different motors. Likewise, such battery system can, in one or more embodiments, contemporaneously provide different AC voltage to different motors, which different AC voltages can have different phases. Such battery system can provide power directly to the motors and to one or more auxiliary systems of a vehicle at least partially contemporaneously. As mentioned above, balancing of cell/cluster charge and/or health can enable this provision of different current/voltage outputs to plural external apparatuses.

Figure 15:
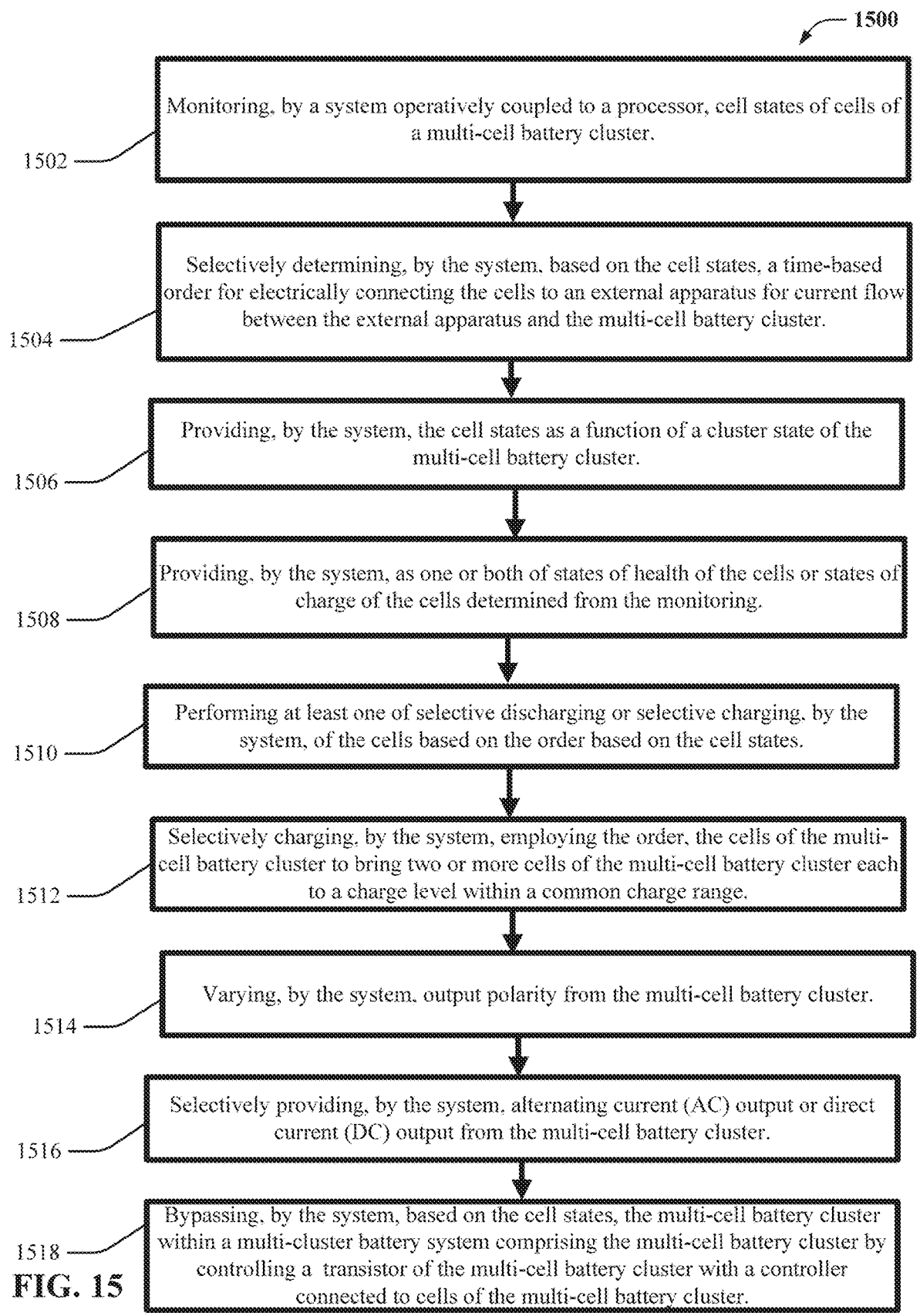
FIG. 15 illustrates a process flow of yet another method of use of a multi-cell battery cluster, in accordance with one or more embodiments described herein.

Turning now to FIG. 15, illustrated is a flow diagram of yet another example non-limiting device-implemented method. The example, non-limiting device-implemented method 1500 can more generally facilitate charging and/or discharging one or more units (e.g., cells and/or multi-cell clusters) in a selectively determined order, in accordance with one or more embodiments described herein. Repetitive description of like elements employed in one or more other embodiments described herein is omitted for sake of brevity.

At 1502, the system-implemented method 1500 can comprise monitoring, by a system operatively coupled to a processor (e.g., monitoring component 210), cell states of cells of a multi-cell battery cluster.

At 1504, the system-implemented method 1500 can comprise selectively determining, by the system (e.g., determination component 212), based on the cell states, a time-based order for electrically connecting the cells to an external apparatus for current flow between the external apparatus and the multi-cell battery cluster.

At 1506, the system-implemented method 1500 can comprise providing, by the system (e.g., determination component 212), the cell states as a function of a cluster state of the multi-cell battery cluster.

At 1508, the system-implemented method 1500 can comprise providing, by the system (e.g., determination component 212), as one or both of states of health of the cells or states of charge of the cells determined from the monitoring.

At 1510, the system-implemented method 1500 can comprise performing at least one of selective discharging or selective charging, by the system (e.g., execution component 216), of the cells based on the order based on the cell states.

At 1512, the system-implemented method 1500 can comprise selectively charging, by the system (e.g., execution component 216), employing the order, the cells of the multi-cell battery cluster to bring two or more cells of the multi-cell battery cluster each to a charge level within a common charge range.

At 1514, the system-implemented method 1500 can comprise varying, by the system (e.g., execution component 216), output polarity from the multi-cell battery cluster.

At 1516, the system-implemented method 1500 can comprise selectively providing, by the system (e.g., execution component 216), alternating current (AC) output or direct current (DC) output from the multi-cell battery cluster.

At 1518, the system-implemented method 1500 can comprise bypassing, by the system (e.g., execution component 216), based on the cell states, the multi-cell battery cluster within a multi-cluster battery system comprising the multi-cell battery cluster by controlling a transistor of the multi-cell battery cluster with a controller connected to cells of the multi-cell battery cluster.

In summary, one or more embodiments herein can facilitate charging and/or discharging of one or more units (e.g., battery cells and/or multi-cell battery clusters of battery cells) based at least in part on state of charge and/or state of health monitoring at one or more of the cell-level and/or cluster-level. An exemplary method can comprise monitoring, by a system operatively coupled to a processor, cell states of cells of a multi-cell battery cluster, and selectively determining, by the system, based on the cell states, a time-based order for electrically connecting the cells to an external apparatus for current flow between the external apparatus and the cluster. The cell states can be provided as a function of a cluster state of the cluster. The cell states can be provided as one or more of states of health of the cells or states of charge of the cells determined from the monitoring.

An advantage of the one or more embodiments can be ability to individually address cell health, cell charge, cluster health and/or cluster charge of a multi-cell battery cluster or multi-cluster battery system. In one or more examples, by changing active cells often enough (e.g., changing which battery units (e.g., cells and/or clusters) of a battery system are being utilized at any given time), the cells can be protected from damage due to unwanted cell charging. In one or more examples, cell/cluster charging and discharging can both be facilitated simultaneously. In one or more examples, replacement of a full multi-cell battery cluster or multi-cluster battery system can be avoided by balancing charge/discharge of battery units and/or by bypassing one or more battery units. In one or more examples, battery unit charge can be balanced relative to one or more other battery units. This can be accomplished regardless of initial SOC level of any battery unit of a multi-cell battery cluster or multi-cluster battery system. Indeed, in one or more examples, a selectively determined state of health and/or state of charge can be implemented, such as via one or more thresholds, by a respective controller.

Overall, these operations, functions and/or abilities can facilitate improved and/or prolonged battery life and/or improved performance by a respective multi-cell battery cluster and/or multi-cluster battery system.

The one or more flowcharts and/or block diagrams in the figures illustrate the architecture, functionality, and operation of one or more possible implementations of one or more systems, apparatuses and/or methods according to various embodiments described herein. In this regard, one or more blocks in the one or more flowcharts and/or block diagrams can represent a module, segment and/or portion of instructions, which can comprise one or more executable instructions for implementing the specified logical function(s). In one or more alternative implementations, one or more functions noted in one or more of the blocks can occur out of the order illustrated in the Figures. For example, one or more blocks shown in succession can be executed substantially concurrently and/or the one or more blocks can be executed in a reverse order as that illustrated, such as depending upon a functionality involved. It also will be noted that one or more blocks of the one or more flowcharts and/or block diagrams, and/or one or more combinations of one or more blocks thereof, can be implemented by a special purpose hardware-based system that can perform one or more of the specified functions and/or can carry out one or more special purpose hardware and/or computer instructions.

As indicated, one or more aspects are described herein with reference to one or more flowchart illustrations and/or block diagrams of one or more methods, apparatuses and/or systems according to one or more embodiments described herein. It will be understood that one or more blocks of the one or more flowcharts and/or block diagrams, and/or one or more combinations of blocks in the one or more flowcharts and/or block diagrams, can be implemented by one or more computer-readable program instructions.

The computer-readable program instructions can be provided to a processor of a general purpose computer, special purpose computer and/or other programmable data processing apparatus to produce a machine. For example, the instructions, which can execute via the processor of the computer and/or other programmable data-processing apparatus, can create one or more means for implementing the one or more functions and/or processes specified in the one or more flowchart and/or block diagram blocks. The computer-readable program instructions can be stored in a computer-readable storage medium that can direct a computer, programmable data processing apparatus and/or other device to function in a particular manner. For example, the computer-readable storage medium having instructions stored therein can comprise an article of manufacture including instructions that can implement one or more aspects of the one or more functions and/or processes specified in the one or more flowchart and/or block diagram blocks. The computer-readable program instructions can be loaded onto a computer, other programmable data processing apparatus and/or other device to cause one or more operational acts to be performed on the computer, other programmable apparatus and/or other device to produce a computer-implemented process. For example, the instructions that can execute on the computer, other programmable apparatus and/or other device can implement the one or more functions and/or processes specified in the one or more flowchart and/or block diagram blocks.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a graphics processing unit (GPU), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. As used herein, terms such as "store," "storage," "data store," data storage," "database," and substantially any other information storage component relevant to operation and functionality of a component are utilized to refer to "memory components," entities embodied in a "memory," or components comprising a memory. A processor can employ distributed and/or federated machine intelligence, which can be employed to operate and/or facilitate one or more of the aforementioned computer-readable program instructions.

Memory and/or memory components described herein can be either volatile memory or nonvolatile memory, and/or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described herein includes one or more mere examples of one or more systems and/or methods. It is, of course, not possible to describe every conceivable combination of components and/or system-implemented methods for purposes of describing the subject matter. Nonetheless, one of ordinary skill in the art can recognize that one or more further combinations and/or permutations of the disclosed subject matter are possible. Furthermore, to the extent that the terms "includes", "has", "possesses" and/or the like are used in the detailed description, claims, appendices and/or drawings, such terms are intended to be inclusive in a manner similar to the term "comprising" as "comprising" is interpreted when employed as a transitional word in a claim.

It will be understood that when an element is referred to as being "coupled" to another element, the term "coupled" can describe one or more different types of coupling including, but not limited to, chemical coupling, communicative coupling, capacitive coupling, electrical coupling, electromagnetic coupling, inductive coupling, operative coupling, optical coupling, physical coupling, thermal coupling and/or another type of coupling. As referenced herein, an "entity" can comprise a machine, device, hardware, software, computing device and/or human. Such entity can facilitate implementation of the subject matter disclosed herein in accordance with one or more embodiments described herein.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance and/or illustration. For the avoidance of doubt, the subject matter disclosed herein is not limited by such examples. In addition, any aspect and/or design described herein as an "example" and/or "exemplary" is not necessarily to be construed as preferred and/or advantageous over other aspects or designs, nor is it meant to preclude equivalent exemplary structures and/or techniques known to those of ordinary skill in the art.

The description of the one or more various embodiments provided herein has been presented for purposes of illustration but is not intended to be exhaustive and/or limited to the one or more embodiments disclosed. One or more modifications and/or variations will be apparent to those of ordinary skill in the art without departing from the scope and/or spirit of the described embodiments. The terminology used herein was chosen to best explain the principles of the embodiments, practical application and/or technical improvement over technologies found in the marketplace, and/or to enable others of ordinary skill in the art to understand the embodiments disclosed herein.

What is claimed is:

1. A method, comprising:
monitoring, by a system operatively coupled to a processor, respective cell states of cells of a multi-cell battery cluster;
determining, by the system, based on the respective cell states, respective states of health of the cells, wherein the respective states of health indicate respective cells degenerations of the cells;
determining, by the system, based on the respective states, respective states of charge of the cells wherein the respective states of charge indicate respective amounts of charge currently available in the cells;
based on at least one of the respective states of health or the respective states of charge of the cells, determining, by the system, a first cluster of the cells and a second cluster of the cells, wherein the first cluster and the second cluster are disjoint; and
concurrently providing, by the system, from the multi-cell battery cluster, a first voltage output to a first electric motor and a second voltage output to a second electric motor, wherein the first voltage output is different from the second voltage output, and wherein the contemporaneously providing comprises determining, based on at least one of the respective states of health or the respective states of charge of the cells:
a first time-based order for electrically connecting the first cluster of the cells to a first output of the multi-cell battery cluster connected to the first electric motor to provide the first voltage output to the first electric motor, and
a second time-based order for electrically connecting the second cluster of the cells to a second output of the multi-cell battery cluster connected to the second electric motor to provide the second voltage output to the second electric motor.

2. The method of claim 1, wherein the respective cell states are provided as a function of a cluster state of the multi-cell battery cluster.

3. The method of claim 1, wherein the respective cell states comprise at least one parameter, wherein the at least one parameter comprises at least one of temperature, charge level, pressure, cell material chemistry, current flow, and voltage potential.

4. The method of claim 1, further comprising:
performing by the system, at least one of selective discharging or selective charging of the cells based on at least one of the respective states of health or the respective states of charge of the cells.

5. The method of claim 1, further comprising:
selectively charging, by the system, based on at least one of the respective states of health or the respective states of charge of the cells, the cells of the multi-cell battery cluster to bring two or more cells of the multi-cell battery cluster each to a charge level within a common charge range.

6. The method of claim 1, further comprising:
varying, by the system, output polarity from the multi-cell battery cluster; and
selectively providing, by the system, alternating current (AC) output or direct current (DC) output from the multi-cell battery cluster.

7. The method of claim 1, further comprising:
bypassing, by the system, based on the respective cell states, the multi-cell battery cluster within a multi-cluster battery system comprising the multi-cell battery cluster by controlling a transistor of the multi-cell battery cluster with a controller connected to cells of the multi-cell battery cluster.

8. The method of claim 1, further comprising:
selectively charging, by the system, one or more cells of the multi-cell battery cluster; and
simultaneously with the selective charging, selectively discharging, by the system, one or more other cells of the multi-cell battery cluster or of another multi-cell battery cluster,
wherein the multi-cell battery cluster and the another multi-cell battery cluster are connected together as a multi-cluster battery system.

9. A device, comprising:
a multi-cell battery cluster; and
a controller connected to cells of the multi-cell battery cluster, wherein the controller:
monitors respective cell states of the cells of the multi-cell battery cluster,
determines, based on the respective cell states, respective states of health of the cells, wherein the respective states of health indicate respective cell degenerations of the cells;
determines, based on the respective cell states, respective states of charge of the cells wherein the respective states of charge indicate respective amounts of charge currently available in the cells;
based on at least one of the respective states of health or the respective states of charge of the cells, determines a first cluster of the cells and a second cluster of the cells, wherein the first cluster and the second cluster are disjoint; and
contemporaneously provides, from the multi-cell battery cluster, a first voltage output to a first electric motor and a second voltage output to a second electric motor, wherein the first voltage output is different from the second voltage output, and wherein the contemporaneously providing comprises determining, based on at least one of the respective states of health or the respective states of charge of the cells:
a first time-based order for electrically connecting the first cluster of the cells to a first output of the multi-cell battery cluster connected to the first electric motor to provide the first voltage output to the first electric motor, and
a second time-based order for electrically connecting the second cluster of the cells to a second output of the multi-cell battery cluster connected to the second electric motor to provide the second voltage output to the second electric motor.

10. The device of claim 9, wherein the controller provides the respective cell states as a function of a cluster state.

11. The device of claim 9, wherein the respective cell states comprise at least one parameter, wherein the at least one parameter comprises at least one of temperature, charge level, pressure, cell material chemistry, current flow, and voltage potential.

12. The device of claim 9, wherein the controller further:
at least one of selectively discharges or selectively charges the cells based on at least one of the respective states of health or the respective states of charge of the cells.

13. The device of claim 9, wherein the controller further:
selectively charges, based on at least one of the respective states of health or the respective states of charge of the cells, the cells to bring two or more cells of the multi-cell battery cluster to a charge level within a common charge range.

14. The device of claim 9, further comprising:
a transistor communicatively connected to the controller of the multi-cell battery cluster, wherein the transistor is actuatable by the controller, based on the respective cell states, and wherein the multi-cell battery cluster is bypassable within a multi-cluster battery system comprising the multi-cell battery cluster in response to the transistor actuation.

15. A vehicle, comprising:
a multi-cell battery cluster comprising cells; and
a controller connected to cells of the multi-cell battery cluster, wherein the controller:
monitors respective cell states of the cells of the multi-cell battery cluster,
determines, based on the respective cell states, respective states of health of the cells, wherein the respective states of health indicate respective cell degenerations of the cells;
determines, based on the respective cell states, respective states of charge of the cells wherein the respective states of charge indicate respective amounts of charge currently available in the cells;
based on at least one of the respective states of health or the respective states of charge of the cells, determines a first cluster of the cells and a second cluster of the cells, wherein the first cluster and the second cluster are disjoint; and
simultaneously provides, from the multi-cell battery cluster, a first voltage output to a first electric motor and a second voltage output to a second electric motor, wherein the first voltage output is different from the second voltage output, and wherein the contemporaneously providing comprises determining, based on at least one of the respective states of health or the respective states of charge of the cells:
a first time-based order for electrically connecting the first cluster of the cells to a first output of the multi-cell battery cluster connected to the first electric motor to provide the first voltage output to the first electric motor, and
a second time-based order for electrically connecting the second cluster of the cells to a second output of the multi-cell battery cluster connected to the second electric motor to provide the second voltage output to the second electric motor.

16. The vehicle of claim 15, wherein the controller provides the respective cell states as a function of a cluster state of the multi-cell battery cluster.

17. The vehicle of claim 15, wherein the respective cell states comprise at least one parameter, wherein the at least one parameter comprises at least one of temperature, charge level, pressure, cell material chemistry, current flow, and voltage potential.

18. The vehicle of claim 15, wherein the controller further:
at least one of selectively discharges or selectively charges the cells based on the at least one of the respective states of health or the respective states of charge of the cells.

19. The vehicle of claim 18, wherein the controller further:
selectively charges, based on at least one of the respective states of health or the respective states of charge of the cells, the cells to bring two or more cells of the multi-cell battery cluster to a charge level within a common charge range.

20. The vehicle of claim 18, wherein a first set of cells of the multi-cell battery cluster are selectively chargeable and simultaneously, a second set of cells of the multi-cell battery cluster are dischargeable.

* * * * *